United States Patent [19]
Joseph et al.

[11] Patent Number: 5,915,090
[45] Date of Patent: Jun. 22, 1999

[54] APPARATUS FOR TRANSMITTING A DISTRIBUTED COMPUTING APPLICATION ON A BROADCAST TELEVISION SYSTEM

[75] Inventors: Kuriacose Joseph, Plainsboro; Ansley Wayne Jessup, Jr., Willingboro, both of N.J.; Vincent Dureau, Venice; Alain Delpuch, Los Angeles, both of Calif.

[73] Assignee: Thomson Consumer Electronics, Inc., Indianapolis, Ind.

[21] Appl. No.: 08/819,274

[22] Filed: Mar. 18, 1997

Related U.S. Application Data

[62] Division of application No. 08/233,908, Apr. 28, 1994, Pat. No. 5,819,034.

[51] Int. Cl.⁶ ..................................................... G06F 9/44
[52] U.S. Cl. .................. 395/200.32; 395/200.3; 395/200.31; 395/200.32; 395/200.33; 348/11; 348/12; 348/13; 380/23; 380/25
[58] Field of Search .................. 395/200.32, 200.33, 395/200.31, 200.3, 6, 7; 364/DIG. 1; 348/11, 12, 13; 380/23, 25

[56] References Cited

U.S. PATENT DOCUMENTS

| | | | |
|---|---|---|---|
| 3,602,891 | 8/1971 | Clark | 340/172.5 |
| 3,803,491 | 4/1974 | Osborn | 455/5.1 |
| 3,891,792 | 6/1975 | Kimura | 261/87 |
| 4,264,925 | 4/1981 | Freeman et al. | 348/11 |
| 4,323,922 | 4/1982 | Toonder et al. | 380/7 |
| 4,528,589 | 7/1985 | Block et al. | 380/20 |
| 4,937,784 | 6/1990 | Masai et al. | 380/9 |
| 4,965,825 | 10/1990 | Harvey et al. | 380/9 |
| 5,129,080 | 7/1992 | Smith | 395/182.02 |
| 5,168,356 | 12/1992 | Acampora et al. | 348/409 |
| 5,191,573 | 3/1993 | Hair | 369/84 |
| 5,343,239 | 8/1994 | Lappington et al. | 348/12 |
| 5,371,550 | 12/1994 | Shibutani et al. | 348/570 |
| 5,440,632 | 8/1995 | Bacon et al. | 380/20 |
| 5,440,744 | 8/1995 | Jacobson et al. | 395/200.33 |
| 5,559,548 | 9/1996 | Davis et al. | 348/6 |
| 5,635,978 | 6/1997 | Alten et al. | 348/7 |

FOREIGN PATENT DOCUMENTS

| | | |
|---|---|---|
| 0 145 063 A2 | 6/1985 | European Pat. Off. . |
| 0 570 683 A2 | 11/1993 | European Pat. Off. . |
| 0 583 186 A1 | 2/1994 | European Pat. Off. . |

OTHER PUBLICATIONS

Zander et al, "Softnet—An Approach to High Level Packet Communication", Computer Networking Conferences, pp. 1–4, Mar. 19, 1983.

Primary Examiner—Larry D. Donaghue
Assistant Examiner—Dzung C Nguyen
Attorney, Agent, or Firm—Joseph S. Tripoli; Eric P. Herrmann; Ronald H. Kurdyla

[57] ABSTRACT

A distributed computer system is disclosed which comprises a source of a continuous data stream repetitively including data representing a distributed computing application and a client computer, receiving the data stream, for extracting the distributed computing application representative data from the data stream, and executing the extracted distributed computing application.

10 Claims, 19 Drawing Sheets

| OSI Layer | Protocol Implementation | | | | | | | | | |
|---|---|---|---|---|---|---|---|---|---|---|
| Application 406 | File Transfer 423 | Electronic Mail 424 | Terminal Emulation 425 | Network Management 426 | | | | | | |
| Presentation 405 | FTP Proxy Server 421 | SMTP Proxy Server 422 | | | | | | | | |
| Session 404 | File Transfer Protocol (FTP) 417 | Simple Mail Transfer Protocol (SMTP) 418 | TELNET Protocol 419 | Simple Network Management Protocol (SNMP) 420 | | | | | | |
| Transport 403 | Transmission Control Protocol (TCP) 415 | | | | User Datagram Protocol (UDP) 416 | | | | | |
| Network 402 | Address Resolution 412 | | Internet Protocol (IP) 413 | | | Internet Control Message Protocol 414 | | | | |
| Data Link 401 | Network Interface Cards: Ethernet, StarLAN token Ring 411 | | | | | | | | | |
| Physical 400 | Transmission media: twisted pair, coax or fiber optics 410 | | | | | | | | | |

*FIG. 4*

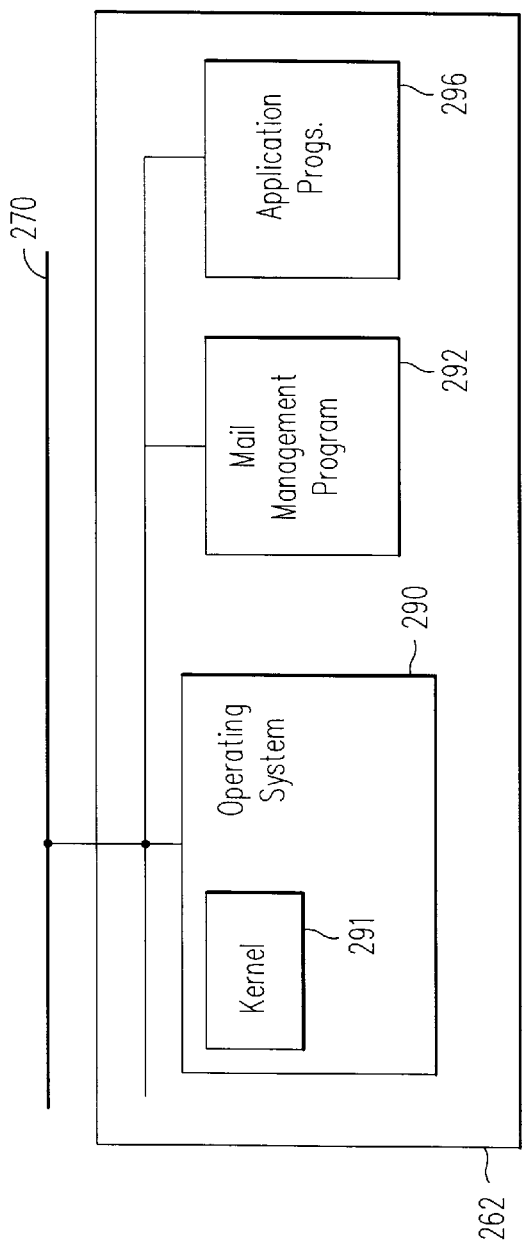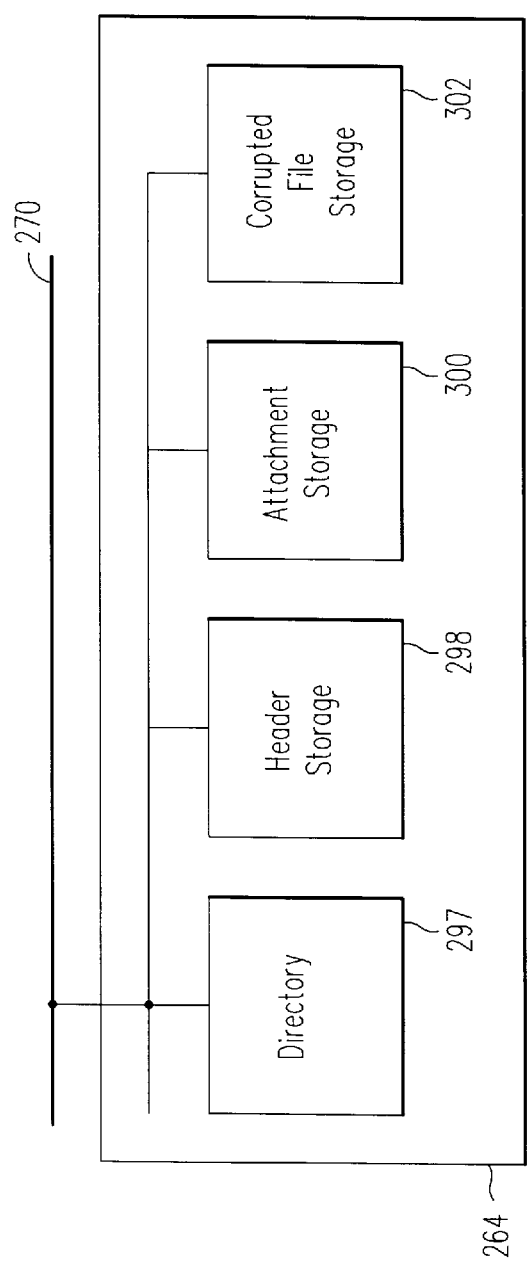

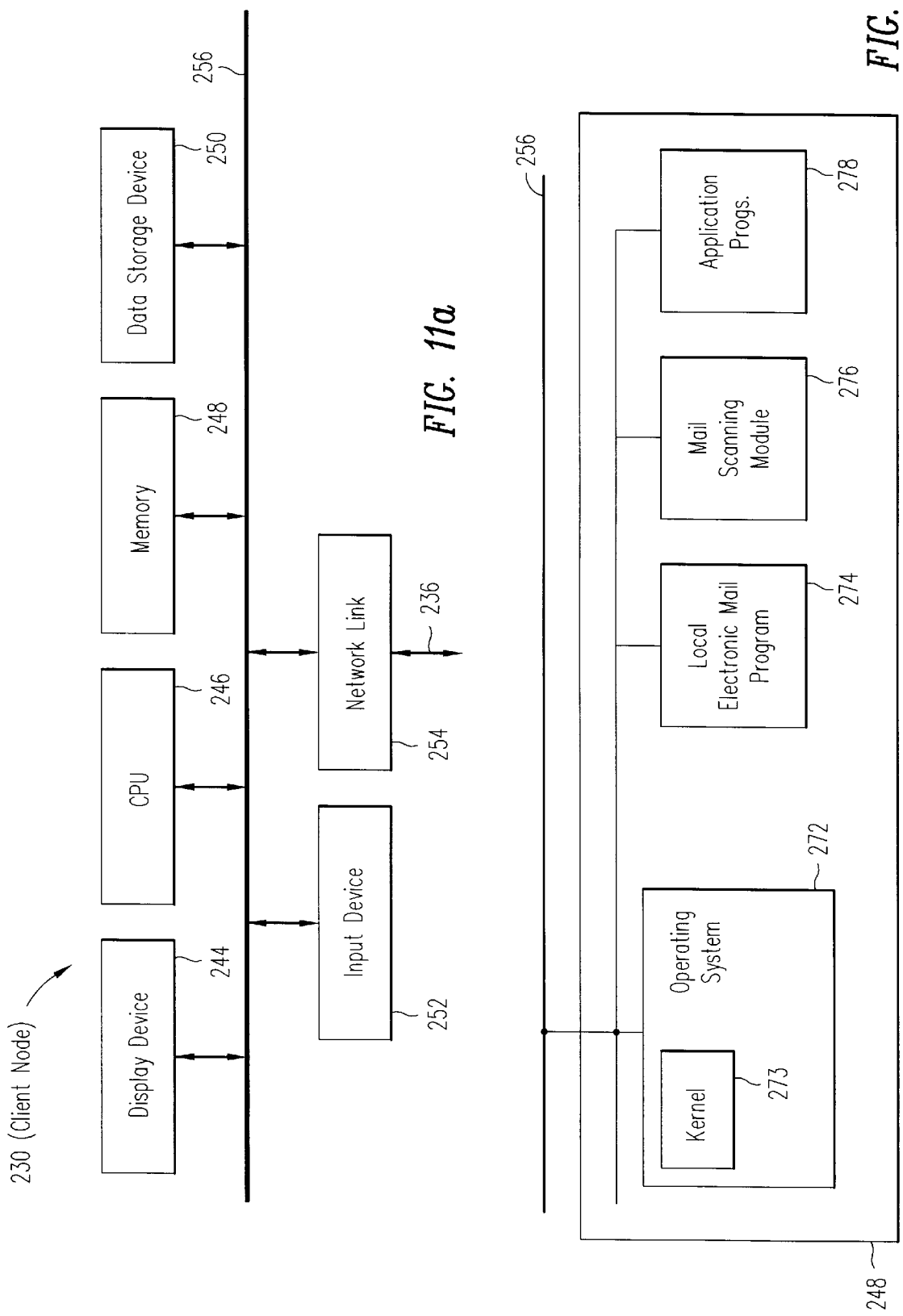

APPARATUS FOR TRANSMITTING A DISTRIBUTED COMPUTING APPLICATION ON A BROADCAST TELEVISION SYSTEM

This is a division of application Ser. No. 08/233,908, filed Apr. 28, 1994, U.S. Pat. No. 5,819,034.

The present invention relates to a client-server distributed computer system. Such a computer system has application in broadcast multimedia applications.

Early computer systems were standalone systems, consisting generally of mainframe computers. Later, several mainframe computer systems were closely connected, or clustered, to handle larger computing jobs, such as a large number of time sharing users. With the advent of personal computers, large numbers of relatively low power standalone computer systems were controlled directly by their users. Soon these large numbers of personal computers were coupled together into networks of computers, providing shared resources and communications capabilities to the users of the individual personal computers and between those users and the preexisting mainframe computers.

One form of such a network includes a central computer, called a server, which generally includes a large amount of mass storage. Programs used by the network users are centrally stored in the mass storage on the server. When a user desires to run a program, the user's computer requests that a copy of that program be sent to it from the server. In response to that request, the server transfers a copy of the program from its mass storage to the main memory of the personal computer of that user, and the program executes on that personal computer. Data also may be centrally stored in the server and shared by all the users on the network. The data is stored on the mass storage of the server, and is accessible by all the network users in response to a request. The server also serves as a hub for communications of messages (electronic mail) between network users. The server in such a system handles the storage and distribution of the programs, data and messages, but does not contribute any processing power to the actual computing tasks of any of the users. I.e. a user cannot expect the server computer to perform any of the processing tasks of the program executing on the personal computer. While such networks perform a valuable function, they are not distributed computing systems, in which interconnected computers cooperate to perform a single computing task.

In an improvement to such networks, the network may be configured in such a manner that a user on the network may request that the server, or other personal computer connected to the network, execute a program. This is termed remote execution because a computer (server or other personal computer) remote from the requester is executing a program in response to a request from the requester. In such a system, the program of which remote execution is requested is either sent from the requester to the remote computer, or retrieved from the server in response to a request by the remote computer. When the program is received, it is executed. In this manner several computers may be enlisted to cooperate in performing a computing function.

Recently, there have been programs which distribute the actual computing tasks necessary for performing a single computing function. For example, in such a data base program, where the data base is stored in the mass storage of the server, if a user desires to make a query of the data base, the portion of the data base management program on that user's personal computer will generate a query request, which is forwarded to the server. The portion of the data base management program on the server performs the query processing, e.g. parsing the query request, locating where the data specified in the query request resides on its mass storage device, accessing that data, and sending the results back to the requesting personal computer over the network. The portion of the data base management program on the personal computer then processes the data received from the server, e.g. formatting it, and displaying it on the screen or printing it on a printer. While the server is processing the query request, the personal computer is free to perform other processing, and while the personal computer is generating the query request, and processing the resulting data received from the server, the server is free to process query requests from other personal computers.

Other types of programs are also amenable to this type of distributed computing, termed client-server computing. The sharing of the processing tasks between the personal computer and the server improves the overall efficiency of computing across the network. Such client-server computer systems, and remote execution networks, may be termed distributed computing systems because several computers (the server and/or the respective peripheral computers) cooperate to perform the computing function, e.g. data base management.

Recently, broadcast multimedia programs, more specifically, interactive television (TV) programs, have been proposed. Interactive TV programs will allow a viewer of a television program to interact with that program. In an interactive TV system, the central broadcast location (TV network, local TV studio, cable system, etc.) will have a central computer, corresponding to the server computer, which will produce signals related to the interactive TV program to be broadcast simultaneously with the TV (video and audio) signals. These signals carry data representing the interactive TV program and may include commands, executable program code and/or data for controlling the viewer interaction. Each viewer location will have a computer, corresponding to the client computer, which will receive the commands, executable code and/or data from the central computer, execute the executable code, process the received data, accept input from the user and provide data to the user by means of the TV screen. The input from the user may be sent back to the computer at the broadcast location, allowing the user to interact with the interactive TV program.

U.S. Pat. No. 4,965,825, SIGNAL PROCESSING APPARATUS AND METHODS, issued Oct. 23, 1990 to Harvey et al., describes an interactive TV system in which a central broadcast location includes signals carrying commands, executable code and data in, for example, the vertical blanking interval of the television signal for receipt by the computer systems at the viewer locations. A computer at the viewer location extracts the commands, executable code and data and executes the code to process the data and interact with the user. Such a system is comparable to the remote execution function of distributed computer systems, described above, in that the viewer computer is enlisted into the interactive TV program, and is controlled by the central location.

In all of the above systems, a central computer controls or responds to requests from peripheral computers attached to it through a network. I.e. the peripheral computer (personal computer) requests remote execution of a program, requests a file or message from, or sends a query request to, another computer. Only in response to a request does the other computer provide a response, e.g. remote execution, the requested file, message or retrieved data. In addition, in general, the peripheral computer is required to have all the resources necessary to completely, or almost completely, execute the desired program, with the server acting only as another storage mechanism. or at most sharing a portion of the computing tasks.

The inventors propose a distributed computing system in which a server computer continuously produces a data stream. This data stream acts a mass storage device for the client computers receiving it. This data stream repetitively includes data representing a distributed computing application in which the client computer may participate, including executable code and data. A transport mechanism, including a high speed, one-way, communication path, carries the data stream from the server to the client. The client receives the data stream, extracts the distributed computing representative data and executes the distributed computing application.

In accordance with principles of the present invention, a distributed computer system comprises a source of a continuous data stream repetitively including data representing a distributed computing application and a client computer, receiving the data stream, for extracting the distributed computing application representative data from the data stream, and executing the extracted distributed computing application.

In a distributed computing system according to the invention, the client computer system need not include all the resources, in particular, main memory and mass storage, necessary to perform the entire program. Instead, no mass storage is required because the data stream provides the function of the mass storage device, and the main memory requirement is modest because only the currently executing portion of the program need be stored in memory. When the currently executing portion has completed, its memory space is freed up, and the next executing portion is extracted from the data stream, stored in the freed memory space, and that portion begins execution.

In addition, a distributed computing system according to the present invention allows the user of the client computer to have the option participating in the distributed computing task. If it is desired to participate, the client computer extracts the data representing the distributed computing application and executes the distributed computing application, as described above. If it is desired not to participate, the data stream is merely ignored, and the processing desired by the user, or none at all, is performed. Such a distributed computing system also allows each participating client computer to join the distributed computing function at any time and to proceed at its own pace in performing its own computing function.

A distributed computing system according to the present invention is particularly amenable to interactive TV applications because it allows a viewer to tune into an interactive TV channel at any time, join in the interactivity whenever desired (or not at all), and allows all the viewers to proceed at their different paces. This is especially advantageous in an environment when an interactive commercial, with its own executable code and data, may be presented within an interactive program, or when the viewer wishes to change channels.

Figure 1:
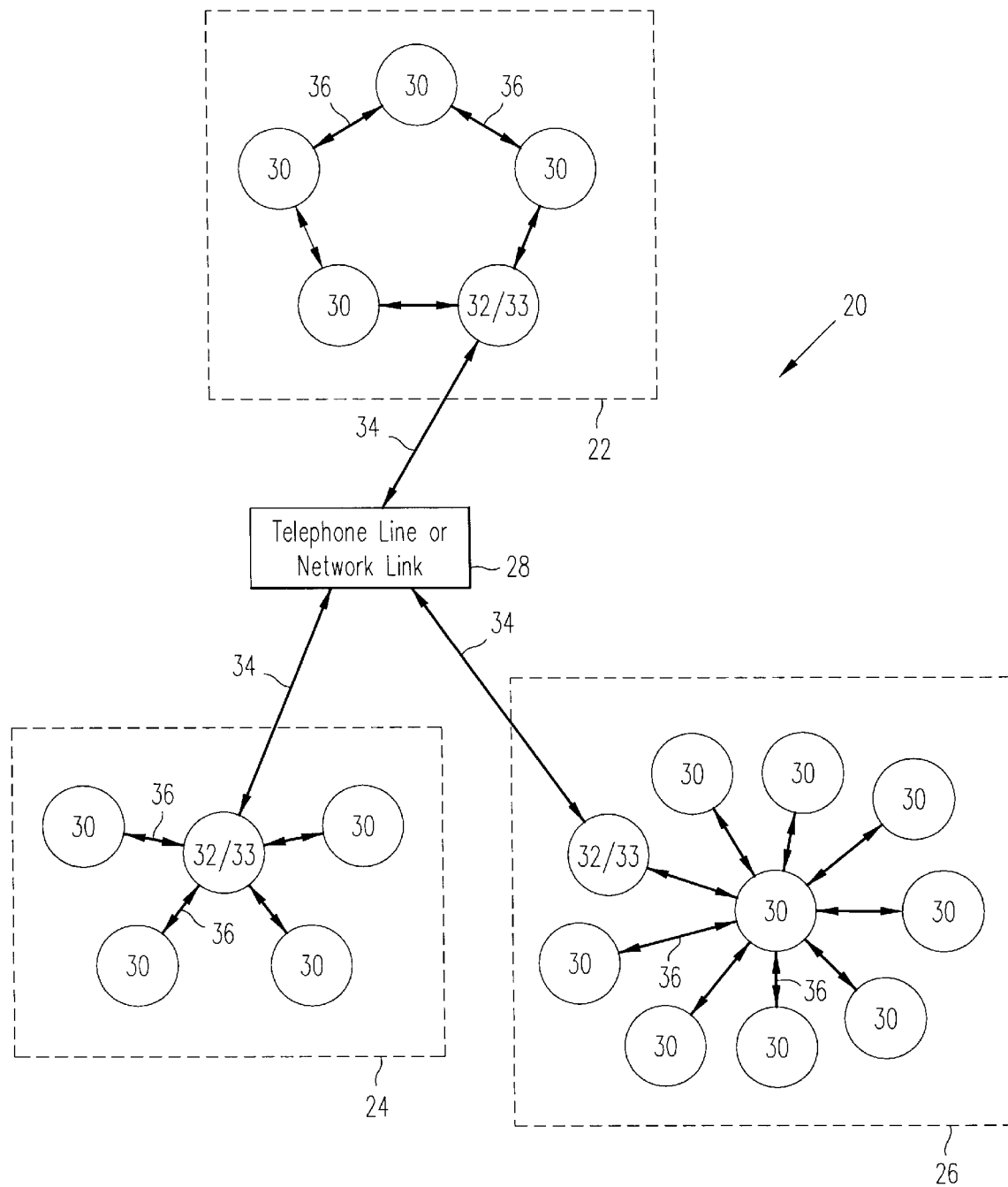
FIG. 1 is a block diagram of a distributed computing system according to the present invention.

FIG. 1 is a block diagram of a distributed computing system according to the present invention. In FIG. 1, a server computer 10, which may include a large computer system, is coupled to a plurality of client computers 20 through a transport mechanism 30. The server computer 10 may be coupled to more than the three client computers 20 illustrated in FIG. 1, and the client computers 20 may be geographically widely dispersed. Client computer 22 is bidirectionally coupled to a local computer 40, to an auxiliary data processing system 50 and to a central processing facility 60. The central processing facility 60 is bidirectionally coupled to the server computer 10. The central processing facility 60 may also be connected to facilities other than the server computer 10 illustrated in FIG. 1. The local computer 40 is further bidirectionally coupled to a mass storage device 70. The client computer 22 interacts with a user 80 by providing information to the user via a display screen or other output device (not shown) and by accepting information from the user via a keyboard or other input device (also not shown).

Client computers 24 and 26 also interact with their users, (not shown in order to simplify the drawing). In addition, client computers 24 and 26 are bidirectionally coupled to the central processing facility 60. Such links are optional, however. The only requirements for any client computer 20 is a way to interact with a user, and a connection to the transport mechanism 30. Links to local computers, auxiliary data processing systems, and the central processing facility 60 are all optional, and need not be present in every one of the client computers 20.

The transport mechanism 30 includes a unidirectional high speed digital data link, such as a direct fiber optic or digital satellite link from the server 10 to the client computers 20. The data may be transported over the transport system 30 by a packet data system. In such a system, a stream of data packets, each including identification information indicating, among other things, the type of data contained in that packet and the actual data, is transmitted through the data link. Such a packet data system allows several independent streams of data, each identified by identification information in their packets, to be time multiplexed within a single stream of packets.

In addition, it is possible to multiplex a plurality of such packet data streams over respective channels on the same physical medium (fiber optic or satellite radio link) making up the transport mechanism 30. For example, different data streams may be modulated on carrier signals having different frequencies. These modulated carriers may be transmitted via respective transponders on a satellite link, for example. Further, if a particular transponder has sufficient capacity, it is possible to time multiplex several data streams on a single modulated carrier.

The client computers 20 each contain a data receiver for selecting one of the streams of packets being transported over the transport mechanism 30, receiving the selected stream of packets and extracting the data contained in them. Continuing the above example, the data receiver may include a tunable demodulator for receiving one of the respective modulated carriers from the satellite link. In addition, the data receiver may include circuitry for time demultiplexing the respective data streams being carried by that modulated carrier.

In operation, the server 10 produces a continuous data stream in the form of a stream of packets for the client computers 20. The server 10 repetitively inserts a packet, or successive packets, containing data representing the distributed computing application, including at least one executable code module, into the data stream. This code module contains executable code for the client computers 20. The data receiver in, for example, client computer 22, continuously monitors the packets in the data stream on transport mechanism 30. When a packet including identification information indicating that it contains the code module (or a portion of the code module) required by the client computer 22 is present in the data stream, the client computer 22 detects its presence, extracts the code module (or the portion of the code module) from that packet and stores it in the main memory. When the code module is completely received, the client computer 22 begins to execute it.

There may be more than one code module placed in the continuous data stream, each containing a different portion of the distributed computing application. For example, it is possible to divide the distributed computing application into small portions in such a manner that only one portion at a time need be executed at a time. The portion of the distributed computing application currently needed to execute is loaded into the memory of the client computer 22. When that portion has completed its execution, then a code module containing the executable code for the next portion of the distributed computing application is extracted from the data stream, stored in memory and executed. Each portion is extracted from the data stream as needed. If there is sufficient memory in the client computer 22, it is possible to load several code modules into the memory and switch between them, without extracting them from the data flow, but this is not necessary. By structuring a distributed computing application in this manner, the required memory size of the client computer 22 may be minimized.

The server 10 may also repetitively include a packet or packets containing one or more data modules in the data stream. The data modules contain data to be processed by the executable code in the code module. Prior to, or during the execution of the code from a previously extracted code module, the client computer 22 may require access to the data in the data module or modules. If so, the client computer 22 monitors the data stream for the required data module or modules. When packets containing the data module or modules (or portions of the data module or modules) are present in the data stream, they are extracted, and the contents stored in the main memory of the client computer 22. When all the required data modules have been completely received, the client computer 22 begins or continues execution of the code from the code module to process the data from the received data module or modules. As is the case for code modules, it is possible for more than one data module to be stored in memory, if there is sufficient memory in client computer 22.

The server 10 may further repetitively include in the data stream a packet or packets containing a directory of the code and data modules currently being included in the data stream. The directory includes a list of all the code and data modules which are present in the data stream, along with information about those modules. If a directory is present in the data stream, then, prior to extraction of any code or data modules from the data stream, the client computer 22 monitors the data stream for the directory. When packets containing the directory (or portions of the directory) are present in the data stream, they are extracted, and their data stored in the main memory of the client computer 22. When the directory has been completely received, the client computer 22 evaluates the entries in the directory, then requests the first code and/or data module from the data stream and execution proceeds as described above.

Any of the client computers 20 may join the distributed computing function represented by the packet stream at any time, and each of the client computers 20 may operate at its own speed, generally in response to the user 80. In order to allow for this, the server 10 repetitively places the directory and all the code and data modules which the client computers 20 may require to perform their portion of the distributed computing function into the data stream on the transport mechanism 30. Whenever one of the client computers 20 joins the distributed computing function, it monitors the newly selected packet stream on the transport mechanism 30 for the directory module, extracts it, and processes it as described above. During execution, whenever one of the client computers 20 requires the a new code and/or data module, it monitors the data stream on the transport mechanism 30 for the newly required code and/or data module, extracts it and either executes it, if it is a code module, or processes it if it is a data module, as described above.

The packet data stream may also include packets of auxiliary data. This data is not required by the client computer 22 for execution of the code, although it may be related to the execution because the user 80 may interact with the executing program on the client computer 22 based on received auxiliary data. The data stream receiver in the client computer 22 recognizes the auxiliary data packets in the data stream on the transport mechanism 30 and passes them directly to the auxiliary data processor 50. The auxiliary data processor 50 processes its packets independently of the client computer 22. If the auxiliary data must be presented to the user 80, the auxiliary data processor 50 may provide its own display device (not shown) which may be shared with the client computer 22, or the display device (not shown) associated with the client computer 22 may be shared with the auxiliary data processor 50, to provide a single information display to the user 80. The auxiliary data processor 50 may have links to other illustrated elements in (not shown), but that is dependent upon the type of data.

In an interactive TV system, for example, the auxiliary data includes the video and audio portions of the underlying television signal. For example, the auxiliary data would include video packets containing MPEG, or MPEG-like, encoded data representing the television image and audio packets containing digitally encoded audio. Further, there may possibly be several different audio packet streams carrying respective audio channels for stereo, second audio program (SAP) or multilanguage capability. In an auxiliary data processor 50 in such a system, the video packets would be supplied to a known MPEG (or similar) decoder (not shown) which would generate standard video signals, which would be supplied to a television receiver or video monitor (not shown). The audio packets would be supplied to a known audio decoder (not shown) which would generate standard audio signals for the television receiver or speakers (not shown).

In such an interactive TV system, the client computer 22 may, in response to execution of the executable code module, generate graphic displays to supply information to the user 80. These graphic displays may be combined with the standard video signal from the MPEG decoder in a known manner, and the combined image displayed on the television receiver or video monitor. The client computer 22 may also generate sounds to provide other information to the viewer. The generated sounds may be combined, in known manner, with the standard audio signals from the audio decoder, and the combined sound played through the television receiver or speakers.

Furthermore, time code data may be included in either or both of the television auxiliary packet data stream and the packet data stream representing the interactive TV application. This permits synchronization of any graphic images or sounds generated by the client computer 22 with the television signal from the auxiliary data. In this case, the client computer 22 would have access to the time code data, and would control the generation of the graphic image and/or sound to occur at the desired time, as supplied by the time code data.

In such an interactive TV system, both the client computer 22 and the auxiliary data processor 50 may be contained in a single enclosure, such as a television receiver, or television set-top decoder box. A television receiver, or decoder box would include connectors for attaching to a local computer or other equipment.

The user 80 provides input to the program running on the client computer 22 during its execution. This data may be required by the server 10 in order to effect the distributed computing function. In an interactive TV system, for example, user 80 may provide input to the client computer through a handheld remote control unit.

The user data is transferred to the server computer 10 via the central processing facility 60. In one embodiment, data is sent from the client computers 20 to the server computer 10 via modems through the telephone system acting as the central processing facility 60. The server computer 10 receives and processes the data received from the client computers 20 during execution of its portion of the distributed computing function.

Server computer 10 may generate new, or modify existing, code and/or data modules in the data stream on the transport mechanism 30, in a manner described below, based on that received data. Alternatively, the server computer 10 may immediately return information to the client computers 20 in the other direction through the central processing facility 60. The information in newly generated code and/or data modules is processed by all client computers 20 participating in the distributed computing function, while information passed from the server computer 10 to the client computers 20 through the central processing facility 60 is specifically related to the client computer (22, 24, 26) to which that information was sent.

In another embodiment, the central processing facility 60 may include its own computer system, separately connected by modem to both the client computers 20 and the server computer 10 through the telephone system. In either of the above embodiments, the central computing facility 60 provides access to other computers or processing facilities (not shown) via the telephone system. Thus, if information from other computer systems is needed to perform the distributed computing function, those computer systems may be accessed via modem through the telephone system by either the client computers 20 or the server computer 10.

An input/output (I/O) port on the client computer 22 is coupled to a corresponding port on the local computer 40. Local computer 40 is collocated with the client computer 22. Local computer 40 may be a personal computer used by the user 80 of the client computer 22, or may be a larger computer, or computer network located at the same site as the client computer 22. This allows the client computer 22 to access data on the attached mass storage 70 of the personal computer or a computer on the network located at the client computer 22 site. In addition, the client computer 22 may use the mass storage 70 of the local computer 40 for storage of data to be retrieved later. It is likely that the local computer 40 will include both an output device (not shown) such as a computer monitor and an input device (also not shown) such as a computer keyboard. Both of these may be shared with the client computer 22 and/or the auxiliary data processor 50, as described above.

For example, the distributed computing system illustrated in may be part of a widespread corporate computing system, and the server 10 may be located at a central location of that corporation. The client computer 22 may be located a remote location, and the local computer 40 may be coupled to the personal computer network at that location. Workers at that location may store shared data (e.g. financial information) on the server connected to that network. The distributed computing function may include gathering local financial data from the client computers at the remote locations, processing that financial data and returning overall financial results to the client computers. In such an application, the executable code THe executing on the client computer 22 accesses the data from the local computer 40 (either from its attached mass storage 70 or through the network) through the I/O port, and sends it to the server computer 10 through the central processing facility 60. The server computer 10 continues its processing based on the information received from client computer 22 (and other client computers 20), and returns the results of that processing to the client computers 20 either through the central processing facility 60 or via the data stream on the transport mechanism 30.

In another example, the distributed computing system may be an interactive television system, broadcasting a home shopping show as the distributed computing application. In such a case, the auxiliary data carries the video and audio portion of the television signal, which may show and describe the items being offered for sale, and may include both live actors and overlaid graphics generated at the central studio. Code and data modules making up the interactive television application may include data about the products which will be offered for sale during this show, or portion of the show, and executable code to interact with the user in the manner described below.

When a viewer wishes to order an item, a button is pressed on the TV remote control. This button signals the client computer 22 to display a series of instructions and menus necessary to solicit the information necessary to place the order, e.g. the item number, name and address of the viewer, the method of payment, the credit card number (if needed), etc. These instructions are generated in the client computer as graphics which are overlaid on the television video image. It is also possible for a computer generated voice to be generated and combined with the television audio either by voice-over, or by replacing the television audio. The viewer responds to the instruction by providing the requested information via the TV remote control. When the information requested by the on-screen display and/or voice instructions has been entered by the viewer, it is sent to a central computer via the modem in the client computer. An order confirmation may be sent in the other direction from the central computer.

It is also possible that permanent information about the viewer (i.e. the name, address, method of payment and credit card number) may be preentered once by the viewer, so it is not necessary to solicit that information each time an order is placed. The information is stored in permanent memory in the client computer. In such a case, when an order is placed, that information is retrieved from the permanent memory, appended to the item number and transmitted to the central computer. It is further possible that, by means of time codes, or other commands, inserted into the data stream, the client computer will know which item is currently being offered for sale. In such a case, the viewer will be able to order it by simply pressing one button on the TV remote control. In response, the client computer can combine the previously received information related to the item currently being offered for sale with the previously stored personal information related to the viewer, and transmit the order to the central computer and receive the confirmation in return.

Because the code and data modules related to the home shopping program are repetitively inserted into the data stream, a viewer may tune into the program at any time and be able to participate interactively. Similarly, it is not necessary for the viewer to participate interactively, but may simply ignore the interactive portion of the show.

It is also possible for the client computer 22 to receive control information from the local computer 40. For example, the user 80, using the local computer 40, could control the client computer 22 via the I/O port to select a desired one of the data streams on transport mechanism 30, and process the program currently being broadcast on that data stream, with interaction with the user 80 through the input and output devices (not shown) connected to the local computer 40.

It is further possible for the user 80 to cause the client computer 22 to access the server computer 10 through the central processing facility 60, instead of via the data stream on transport mechanism 30, and receive code and data modules via this bidirectional link.

Figure 2:
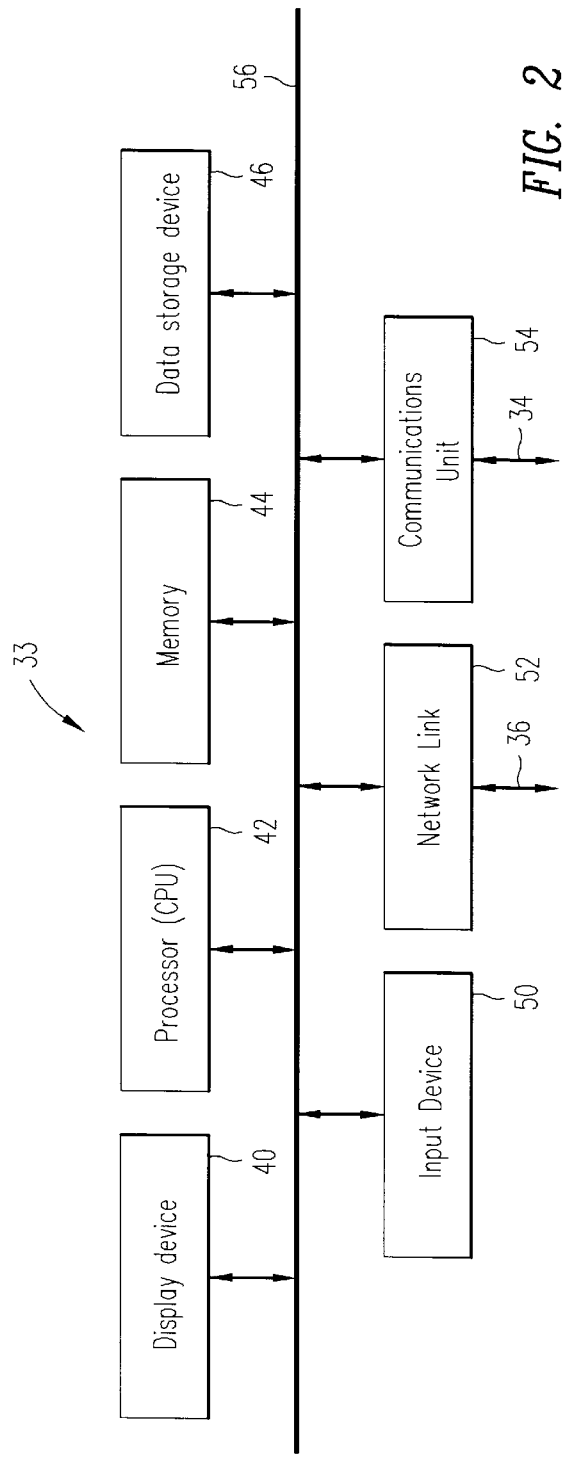
FIG. 2 is a block diagram of a server computer as illustrated in FIG. 1.

FIG. 2 is a block diagram illustrating a server computer 10 as illustrated in FIG. 1. In FIG. 2, a source of distributed computing application code and data 101 includes an application compiler, and software management module (not shown) and has an output terminal coupled to an input terminal of a flow builder 102. An output terminal of flow builder 102 is coupled to an input terminal of a transport packetizer 104. An output terminal of transport packetizer 104 is coupled to a first input terminal of a packet multiplexer 106. An output terminal of packet multiplexer 106 is coupled to an input terminal of a transport multiplexer 110. An output terminal of transport multiplexer 110 is coupled to the physical medium making up the transport mechanism 30 (of FIG. 1). A second input terminal of packet multiplexer 106 is coupled to a source of auxiliary data packets 107. A clock 109 has respective output terminals coupled to corresponding input terminals of the transport packetizer 104 and auxiliary data source 107. A data transceiver 103 has an first bidirectional terminal coupled to the central processing facility 60 (of FIG. 1) and a second bidirectional data coupled to the application code and data source 101.

Application code and data source 101, flow builder 102, transport packetizer 104, auxiliary data source 107, clock 109 and packet multiplexer 106, in combination, form a channel source 108 for the transport mechanism, illustrated by a dashed box in . Other channel sources, including similar components as those illustrated in channel source 108 but not shown in FIG. 1, are represented by another dashed box 108a. The other channel sources (108a) have output terminals coupled to other input terminals of the transport multiplexer 110, and may have input terminals coupled to central processing facilities through data transceivers.

In operation, data representing the distributed computing application program, and data related to the transmission of the program over the transport mechanism 30 are supplied to the flow builder 102 from the application source 101. This data may be supplied either in the form of files containing data representing the code and data modules, or by scripts providing information on how to construct the code and data modules, or other such information. The code and data modules may be constant or may change dynamically, based on inputs received from the client computers 20 via the central computing facility 60 and/or other sources. The executable code and data module files may be generated by a compiler, interpreter or assembler in a known manner in response to source language programming by an application programmer. The data file related to the transmission of the modules includes such information as: the desired repetition rates for the directory and the code and data modules to be included in the data stream; the size of main memory in the client computers 20 required to store each module, and to completely execute the application program; a priority level for the module, if it is a code module, etc.

Flow builder 102 processes the data from the application source 101. In response, flow builder 102 constructs a directory module, giving an overall picture of the application program. The information in the directory module includes e.g. the identification of all the code and data modules being repetitively transmitted in the data stream, their size and possibly other information related to those modules. Then the application program representative data is processed to generate the code and data modules. The directory, code and data modules thus constructed are formatted by adding module headers and error detection and/or correction codes to each module. A transmission schedule is also generated. After this processing is complete, the data representing the directory module and the code and data modules are repetitively presented to the transport packetizer 104 according to the schedule previously generated.

The transport packetizer 104 generates a stream of packets representing the directory module and the code and data modules as they are emitted from the flow builder 102. Each packet has a constant predetermined length, and is generated by dividing the data stream from the flow builder into groups of bits, and adding a packet header with information identifying the information contained in the packet, and an error detection and/or correction code, etc., to each group, such that each packet is the same predetermined length. (If there is insufficient data from the flow builder 102 to completely fill a packet, the packet is padded with null data.) These packets are time multiplexed with the auxiliary data packets, in a known manner, to form a single packet stream in the packet multiplexer 106. It is also possible for the generated packets to have varying lengths. In this case, the packet header for each packet will contain the length of that packet. In addition, time code data packets are placed in the data stream packets and/or the auxiliary data packets based on data received from the clock 109.

Packet streams from all of the channel sources (108, 108a) are multiplexed into a single transport channel, which is transmitted through transport mechanism 30. As described above, the packet streams may be frequency multiplexed by having each packet stream modulate a carrier signal at a different frequency, with all of the carriers being carried by a satellite link to the client computers 20, in a known manner. In addition, if there is sufficient capacity within one carrier channel, several packet streams may be statistically time multiplexed, and used to modulate a single carrier, also in a known manner. For example, it has been proposed to time multiples up to eight interactive television data streams through a single satellite link.

Data from the client computers 20 via the central processing facility 60 (of FIG. 1) is received at the server computer 10 by the data transceiver 103, which may include its own processor (not shown). If an immediate response is generated, the transceiver 103 processor returns that response via the central processing facility 60 to a specific client computer (22–26), a specific set of the client computers 20 or to all client computers 20 in their turn. If, however, a common response to all client computers 20 is desired, the application programmer may amend the code and data files in the application code and data source 101 using the application compiler. These amended files are then processed by the flow builder again to generate another flow. It is further possible that the code and data files in the application source 101 may be amended automatically and dynamically (i.e. in real time) in response to data received from the transceiver 103, and the flow updated as the data is being received from the client computers 20.

Figure 3:
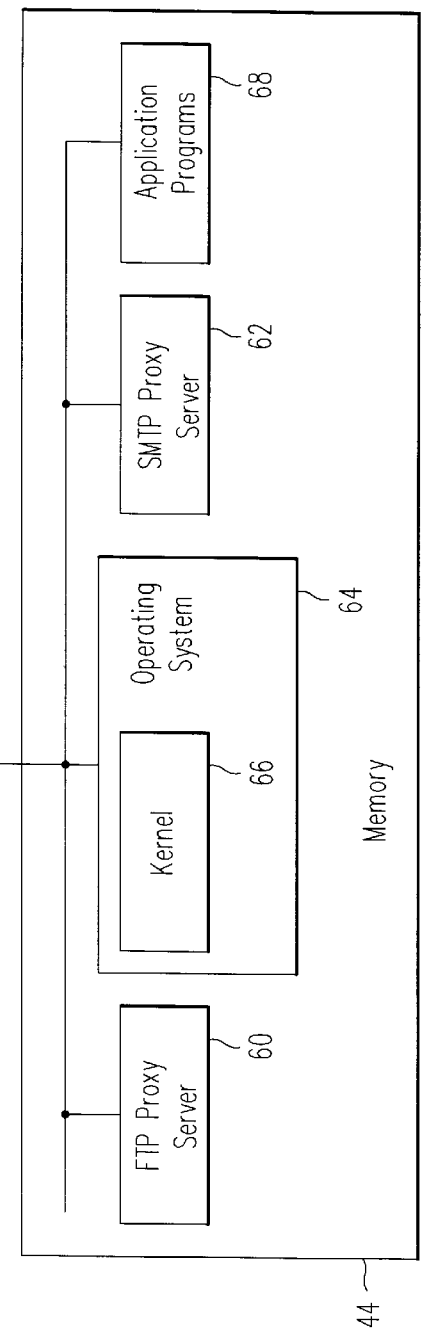
FIG. 3 is a timing diagram illustrating the data streams produced by a server computer in a distributed computing system as illustrated in FIG. 1.
Figure 5A:
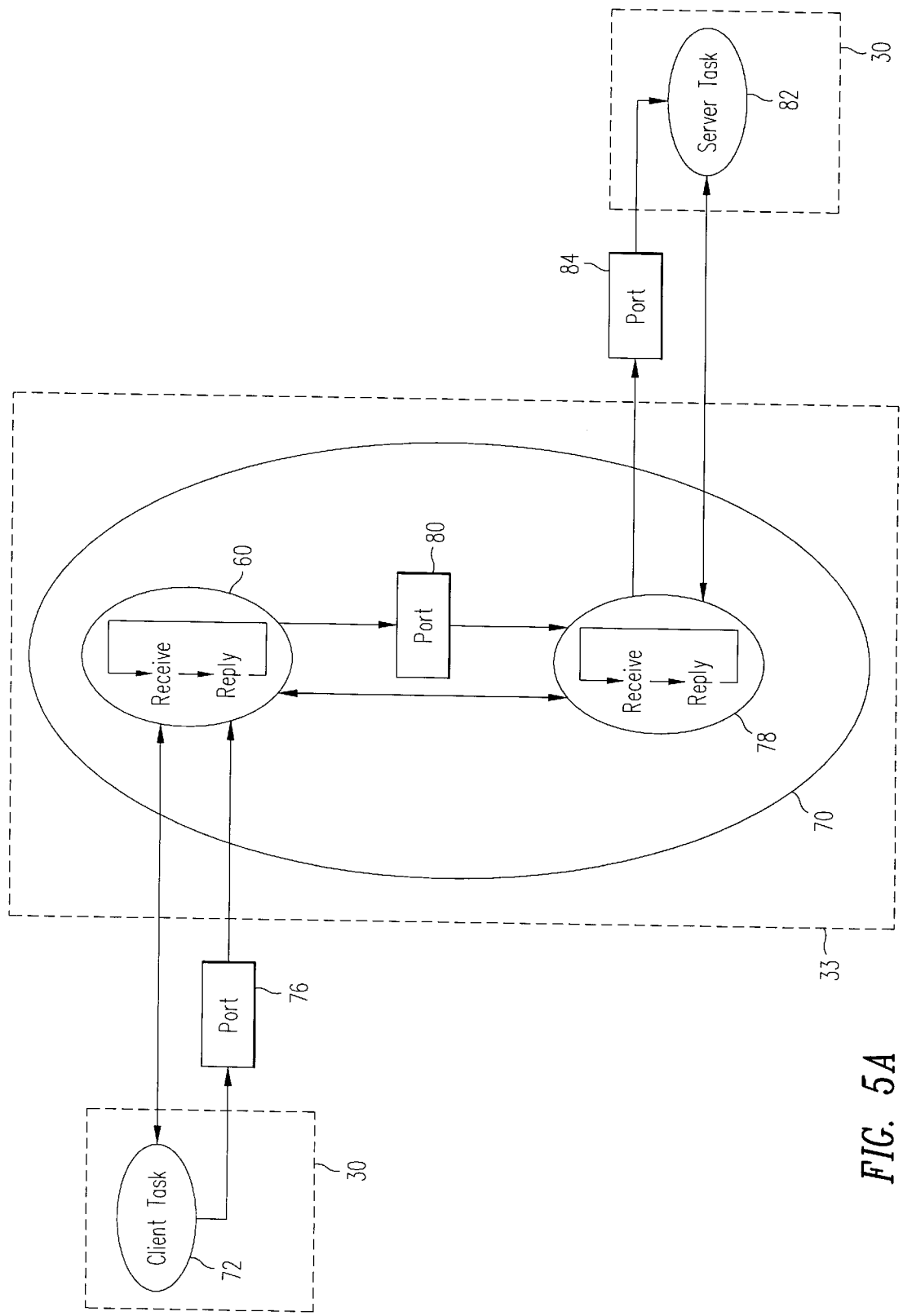
Figure 5B:
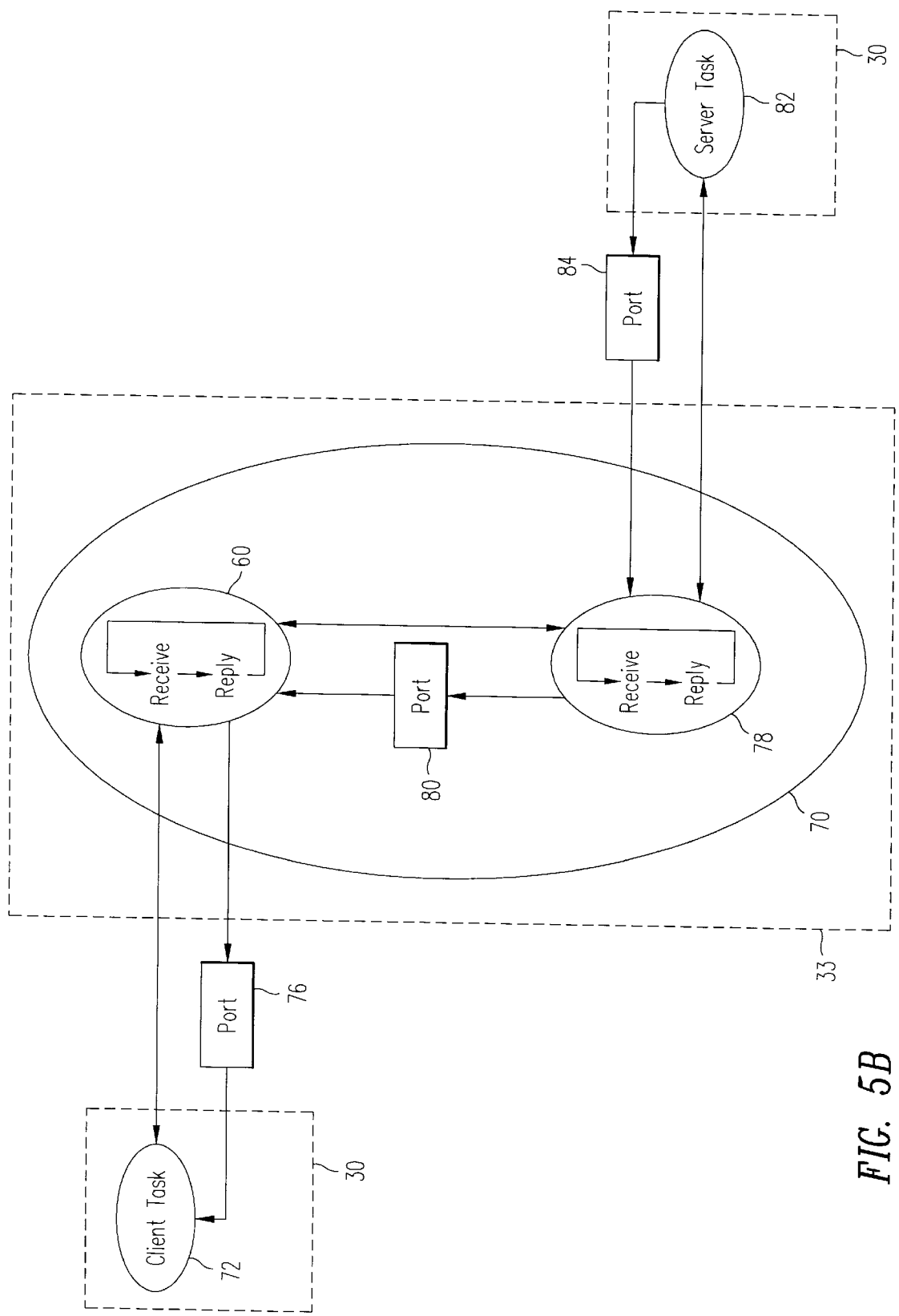
Figure 6A:
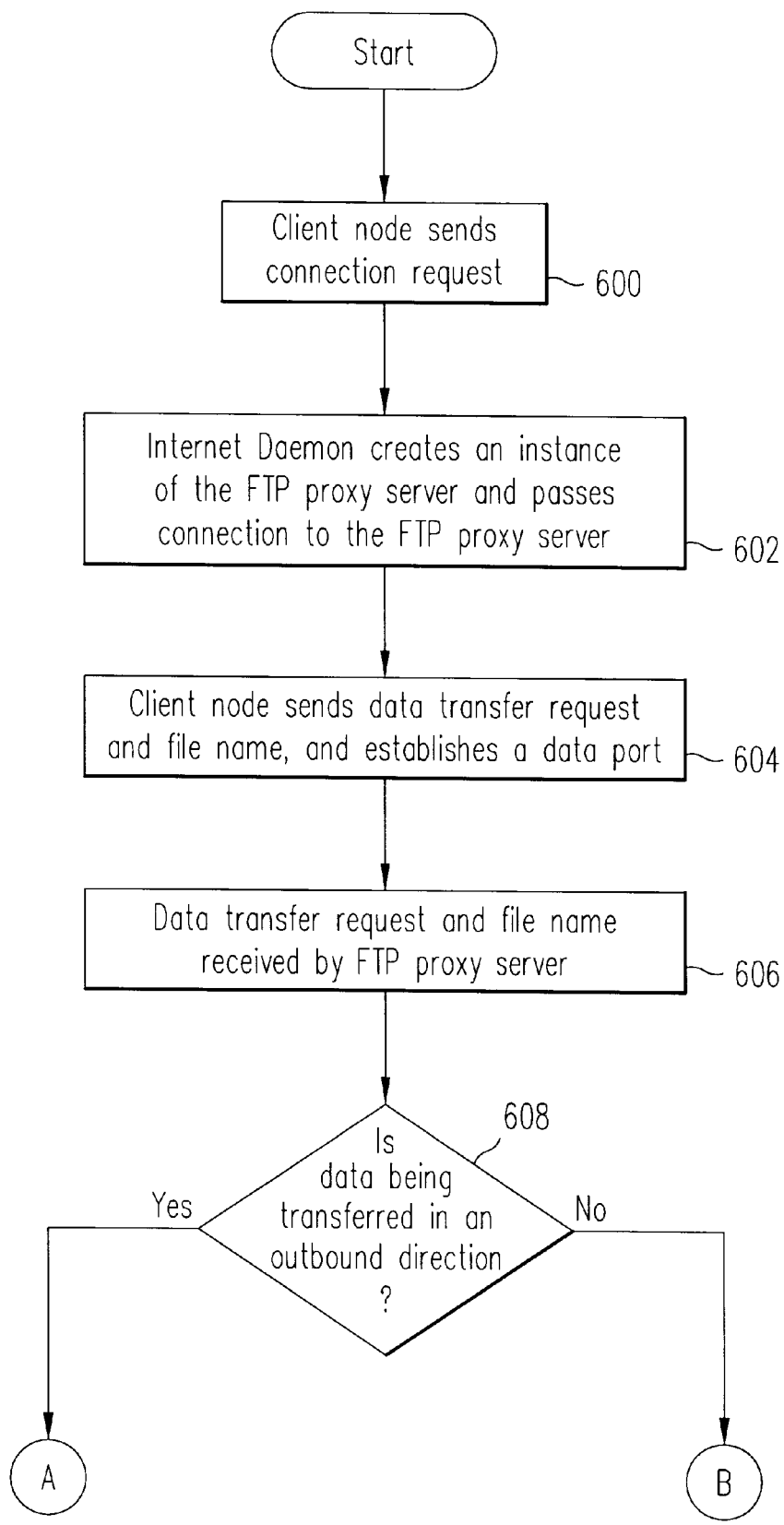
Figure 6B:
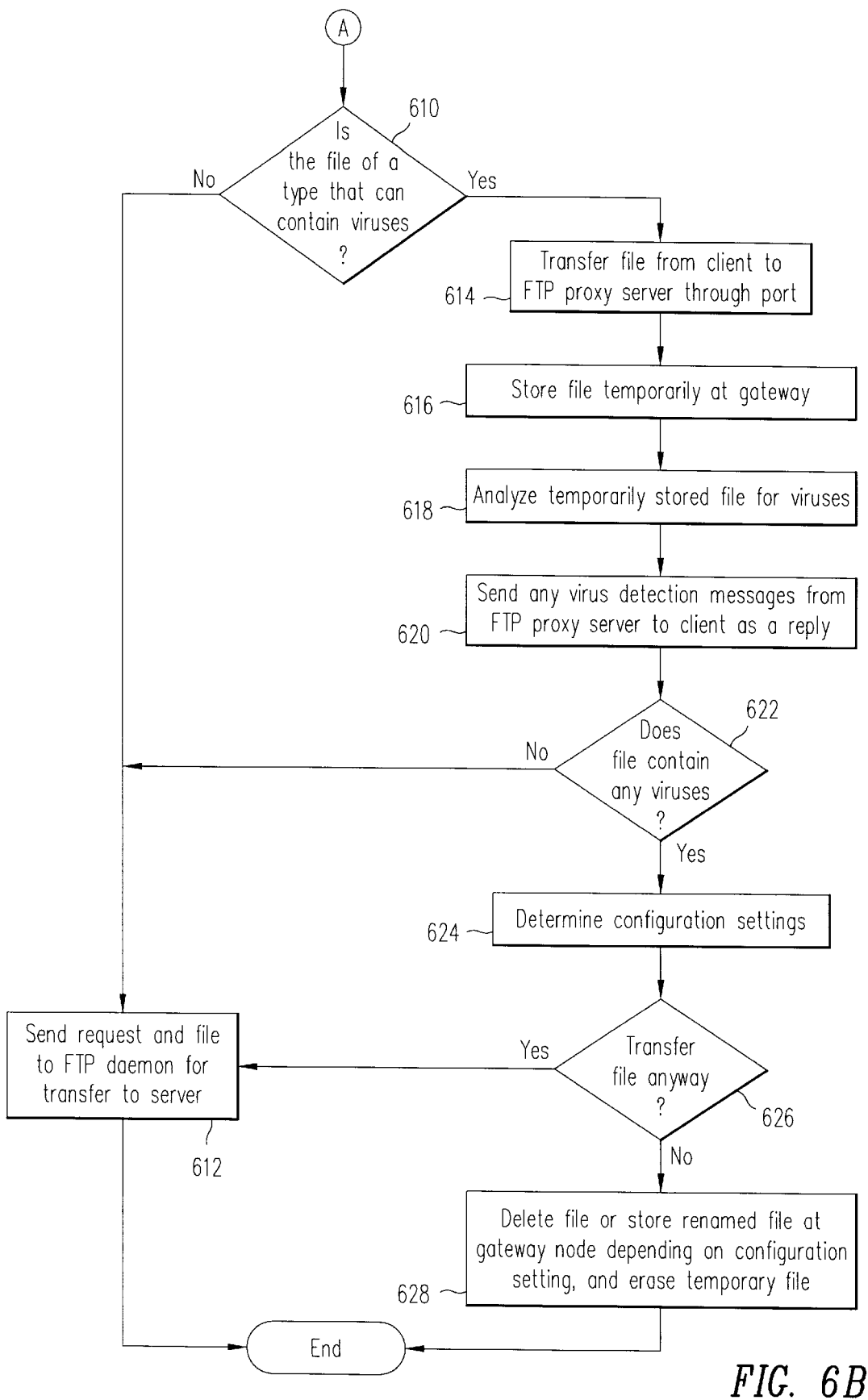
Figure 6C:
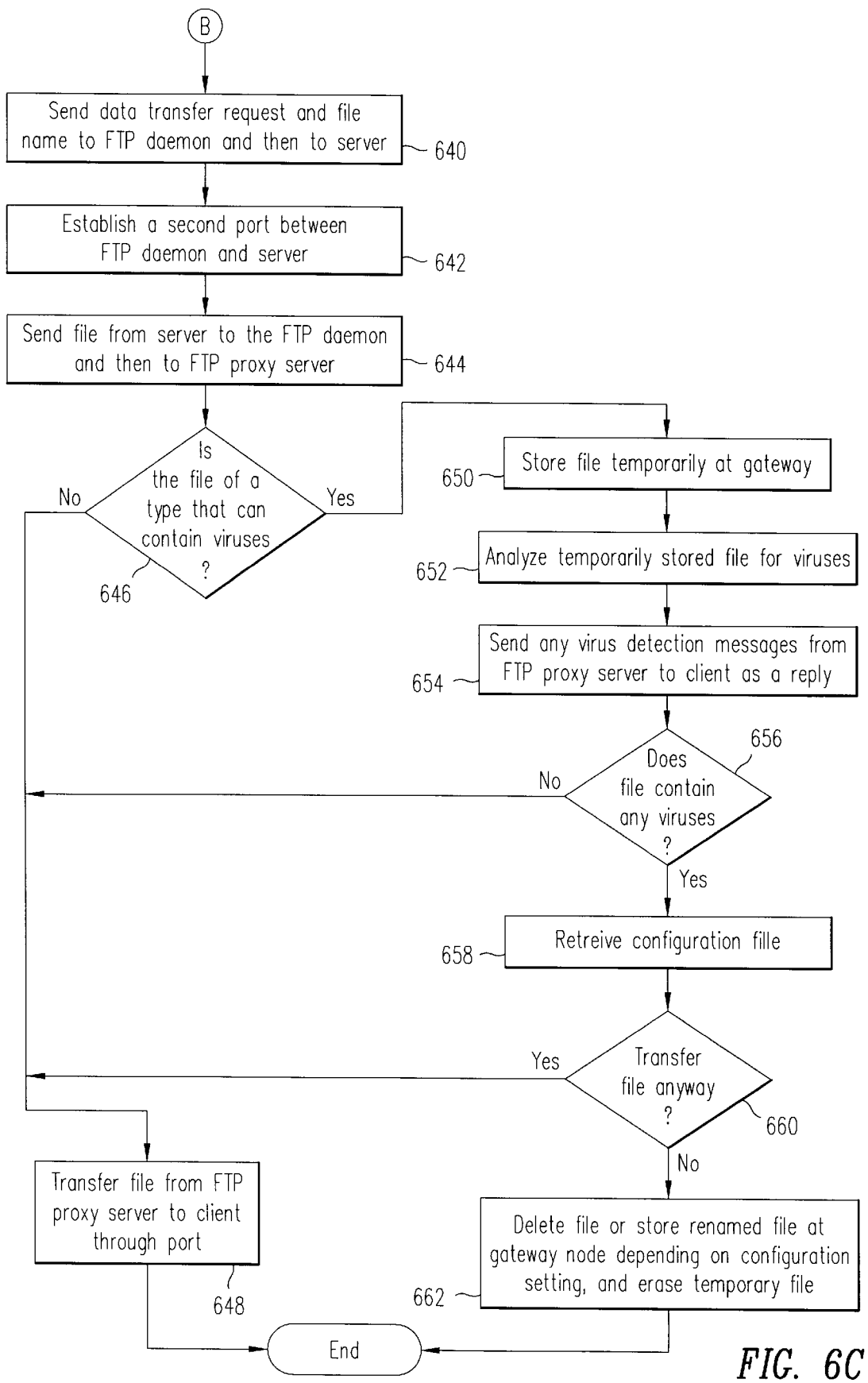
Figure 7:
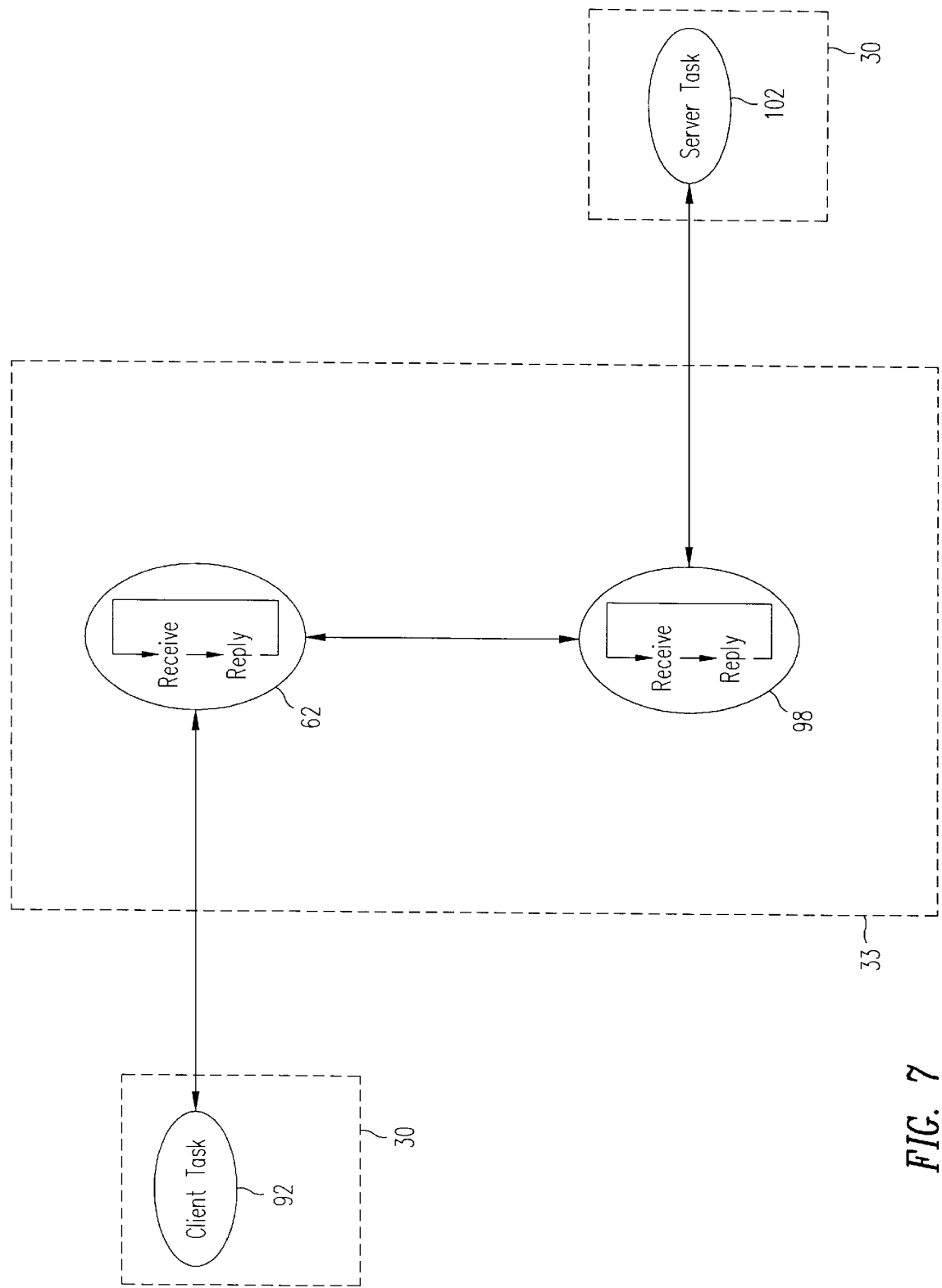
Figure 8A:
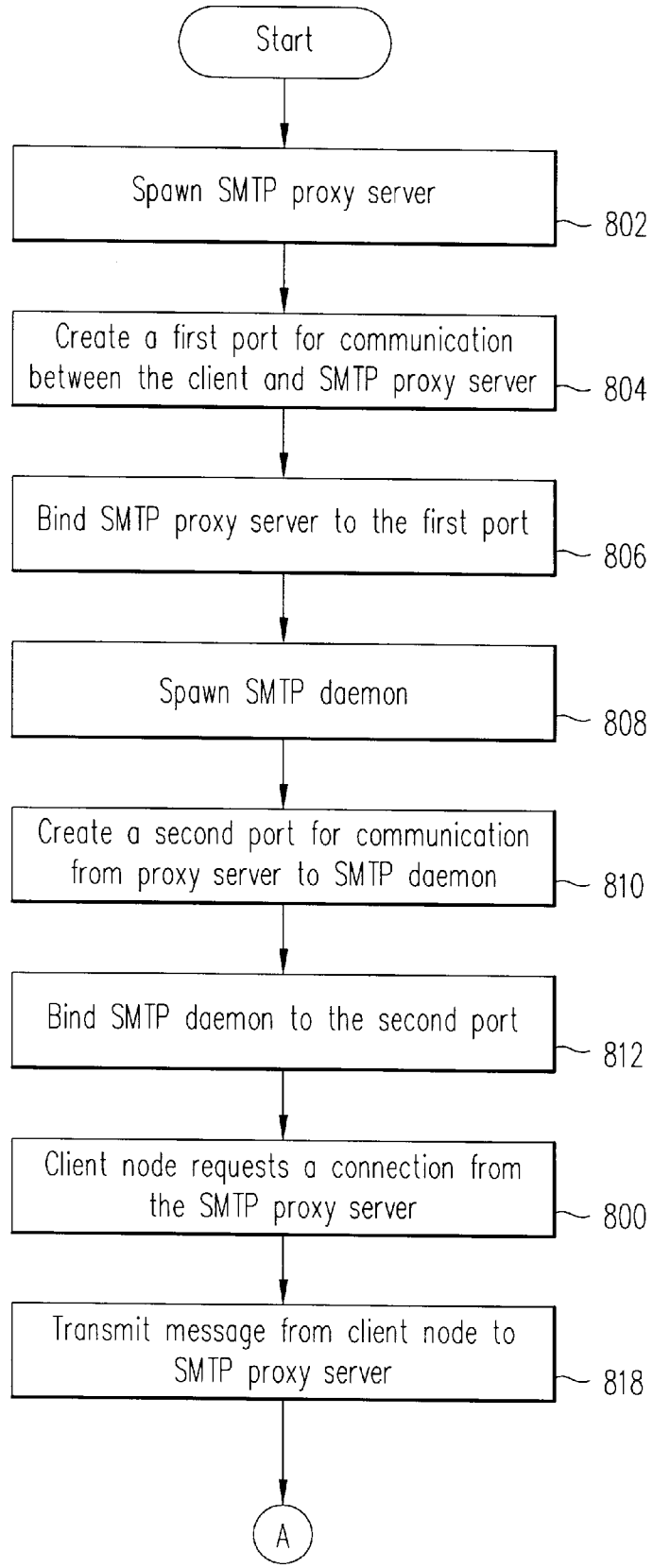
Figure 8B:
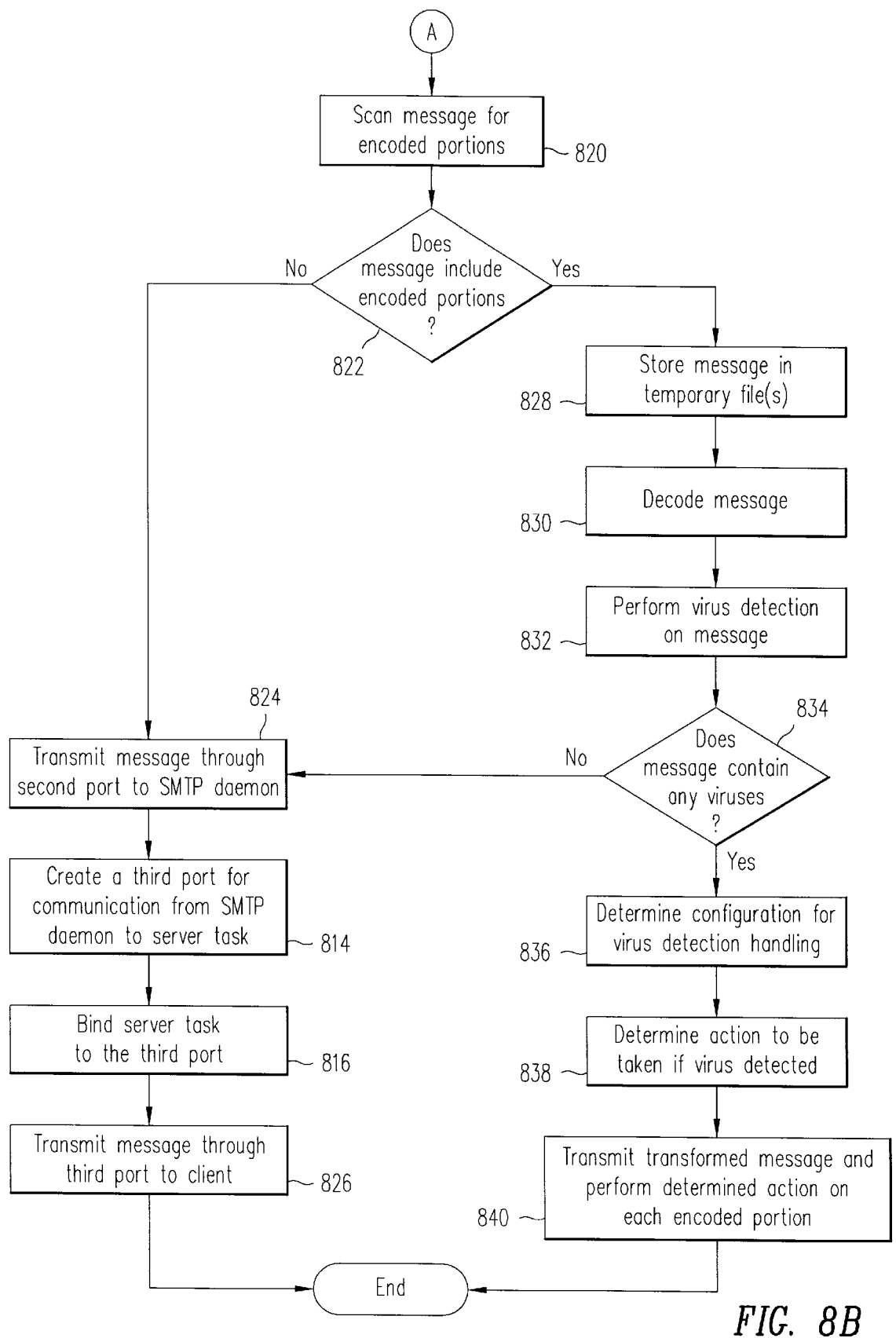
Figure 9:
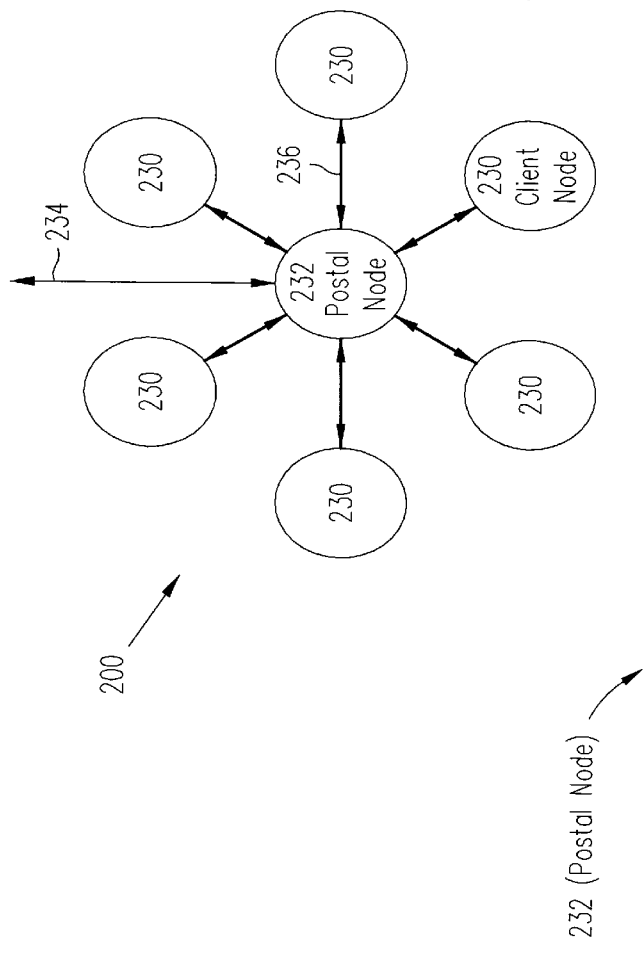
Figure 10A:
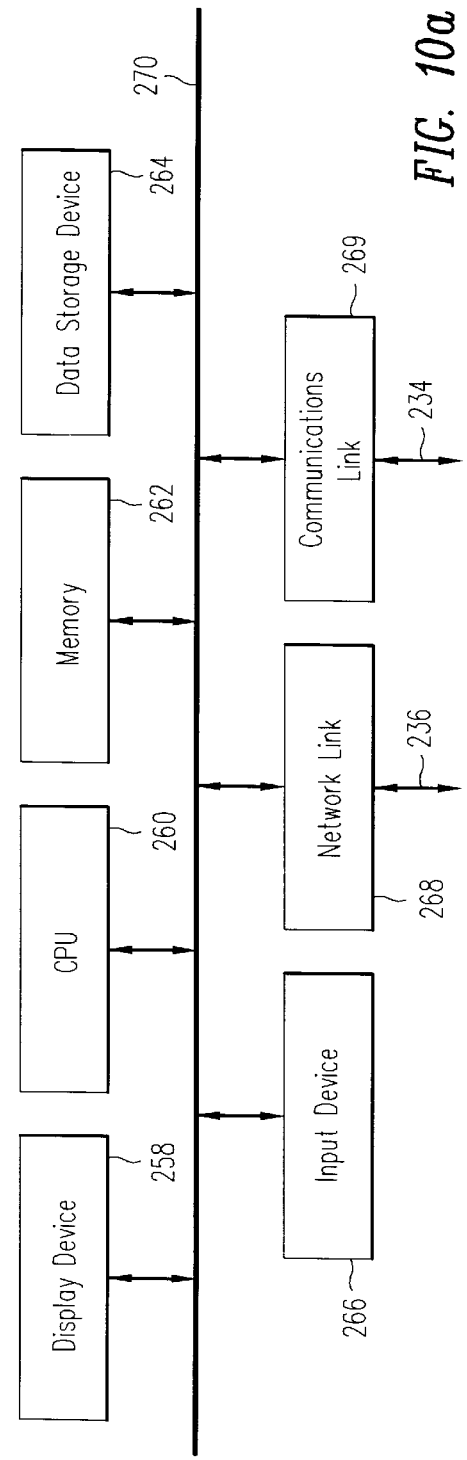
Figure 11C:
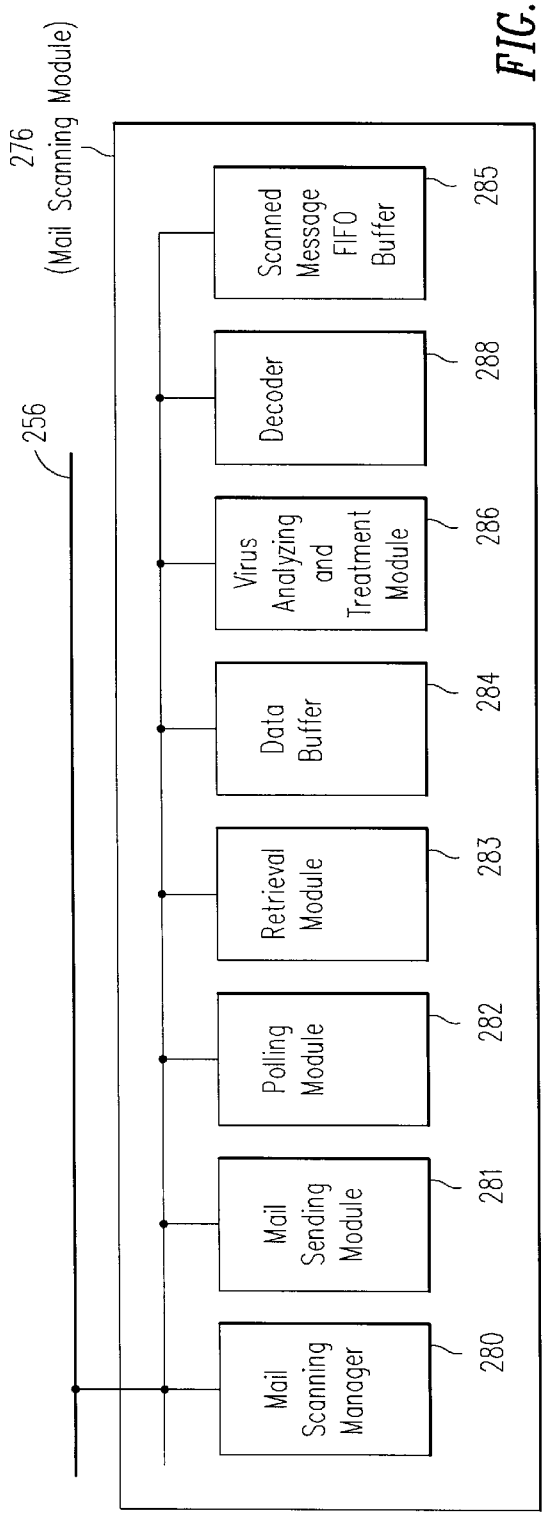
Figure 11D:
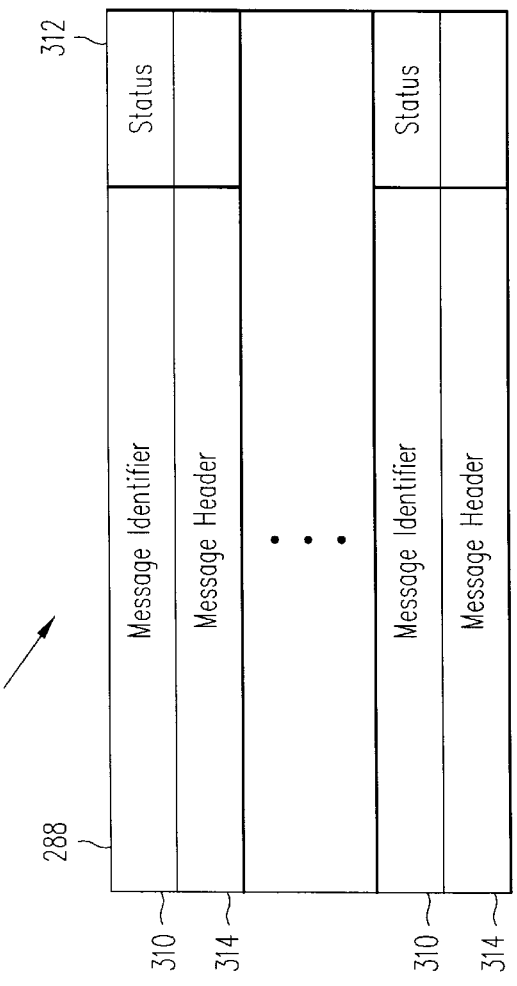
Figure 12:
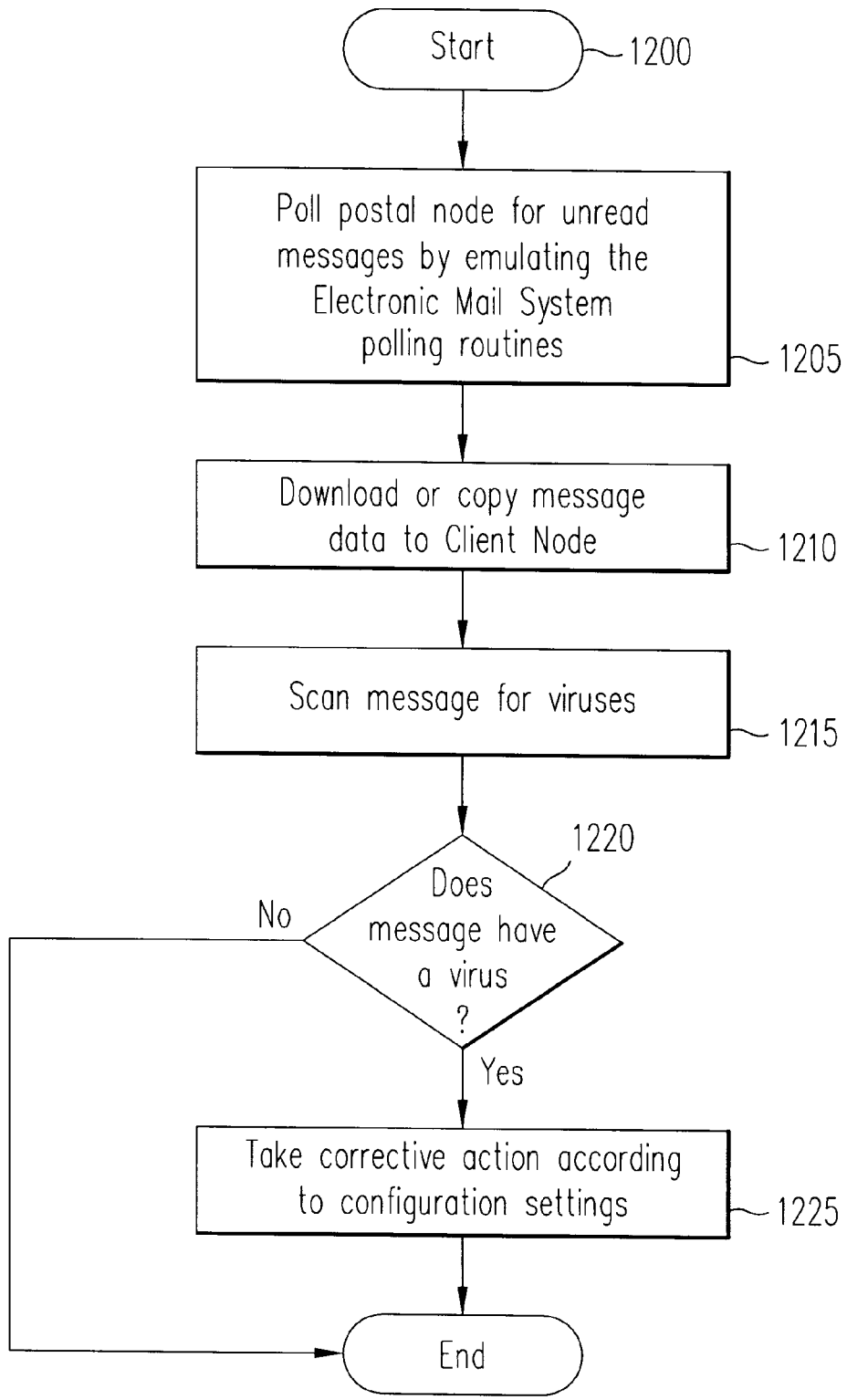
Figure 13:
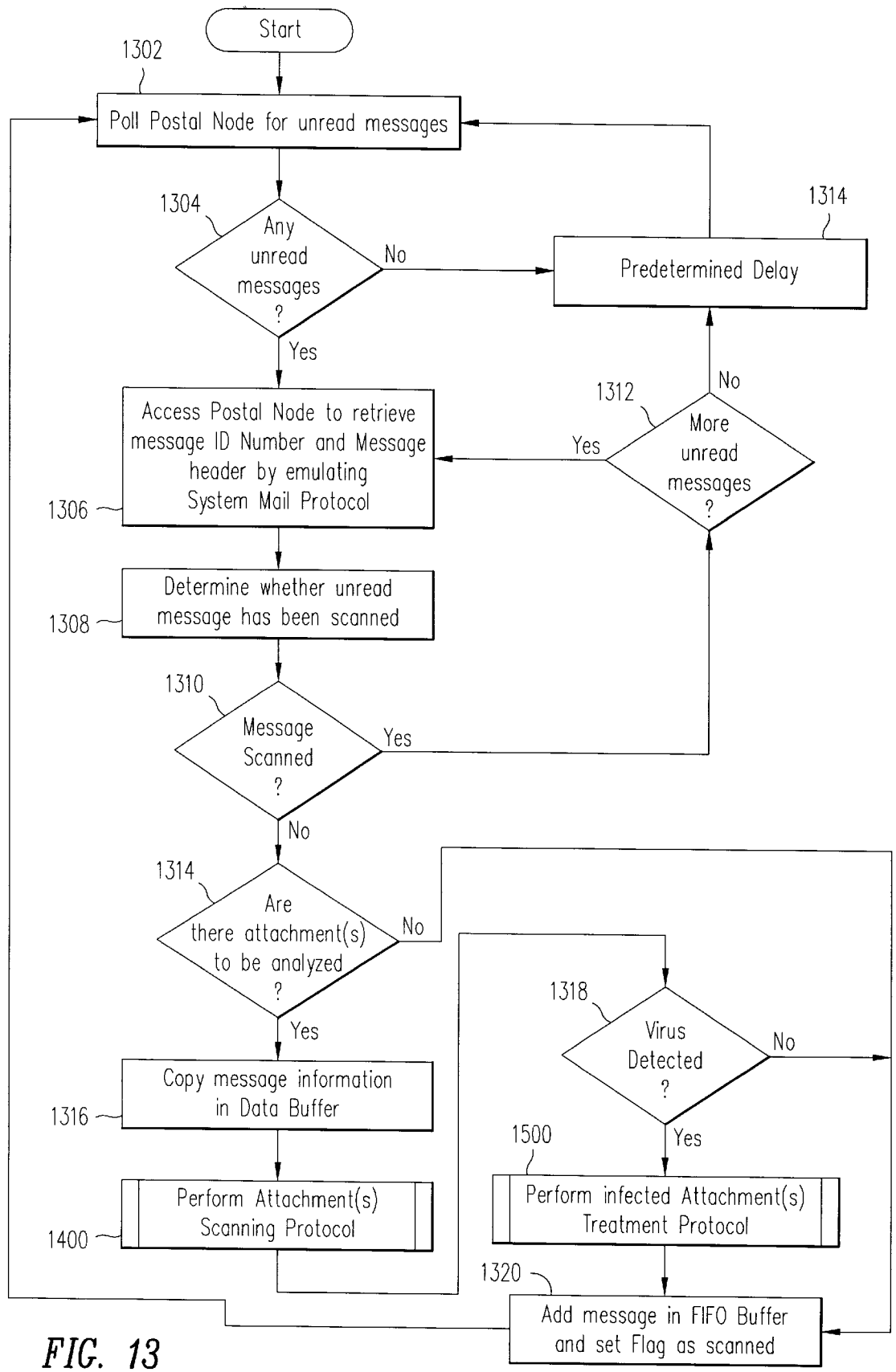
Figure 14:
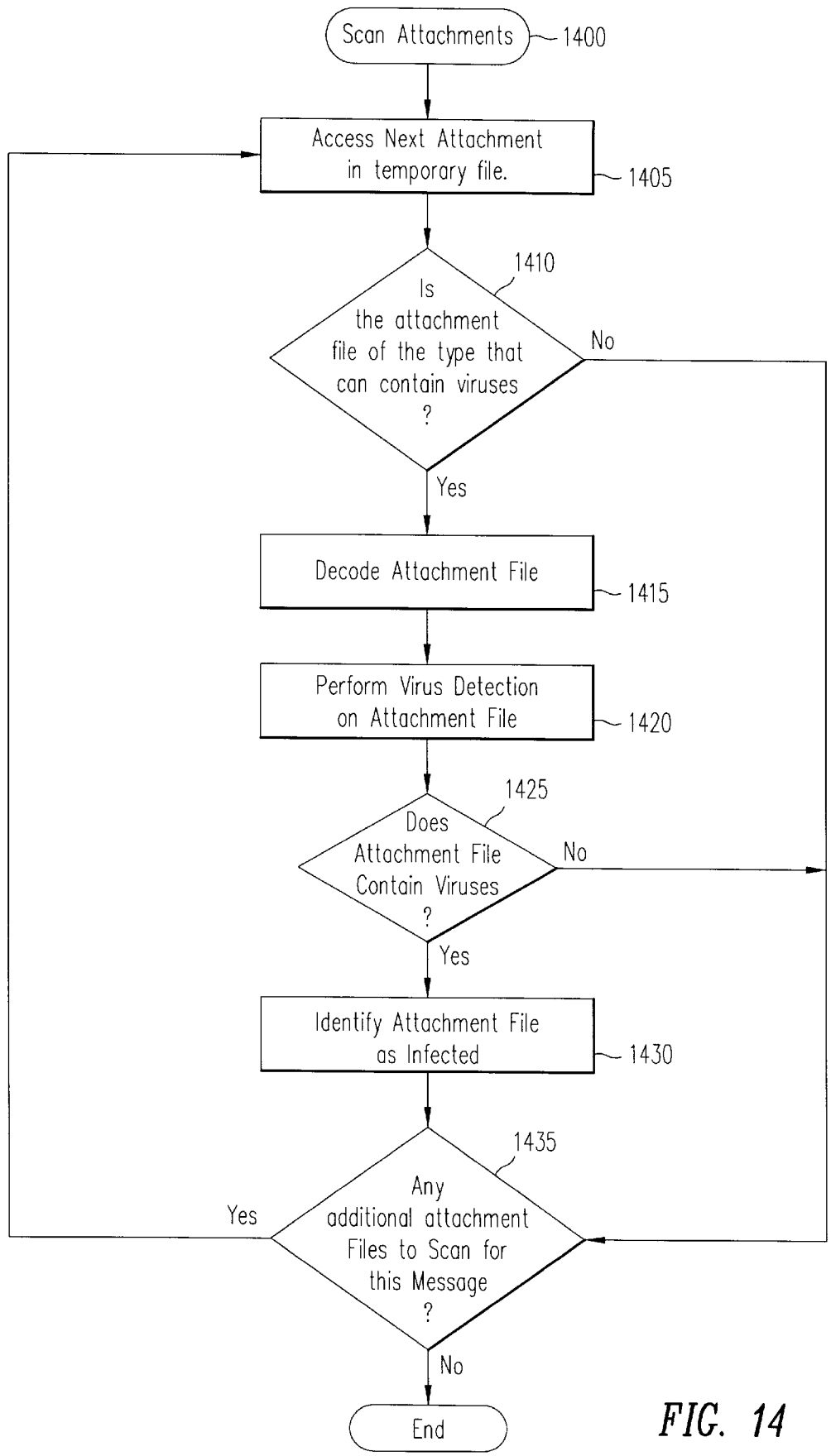
Figure 15:
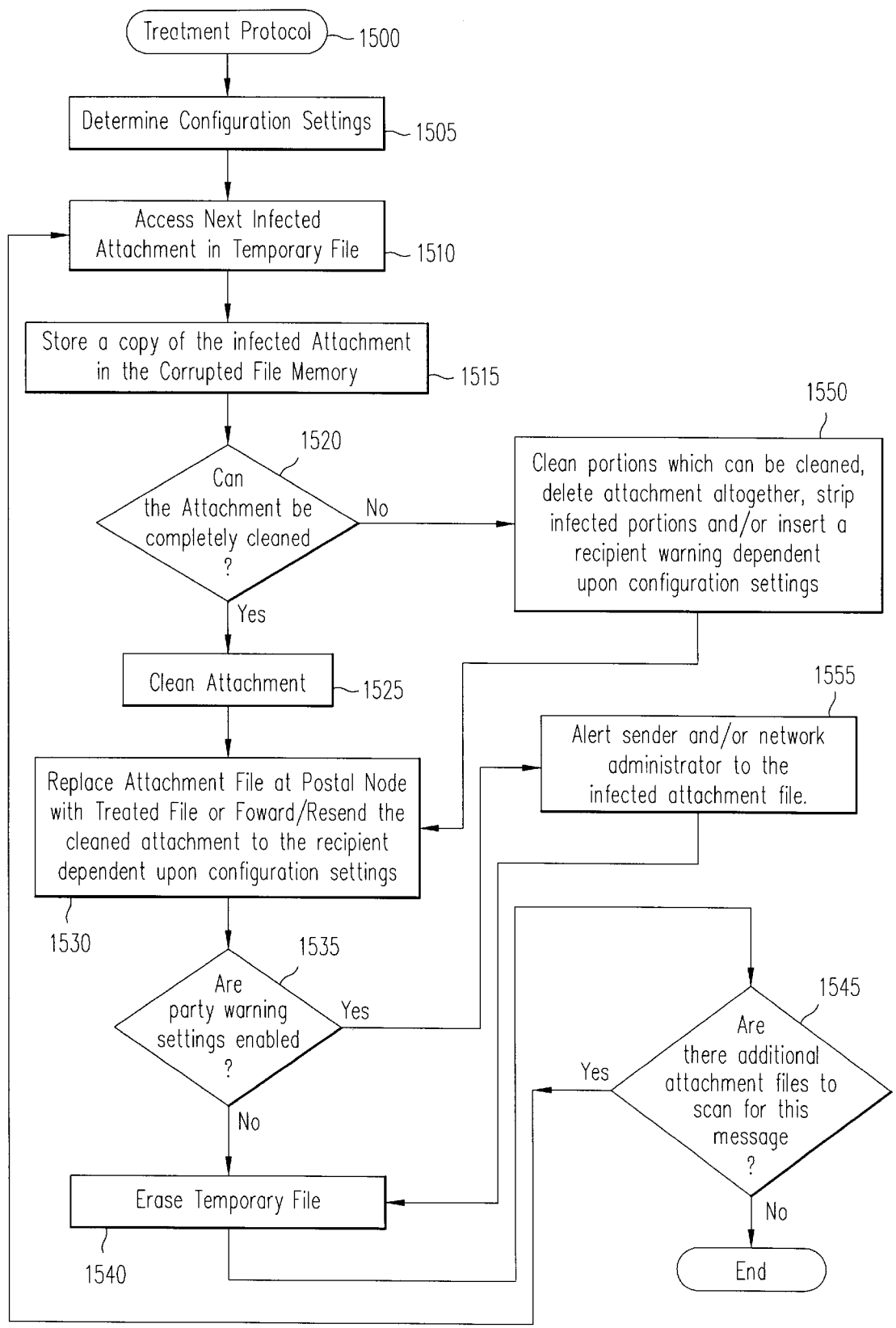
Figure 1:
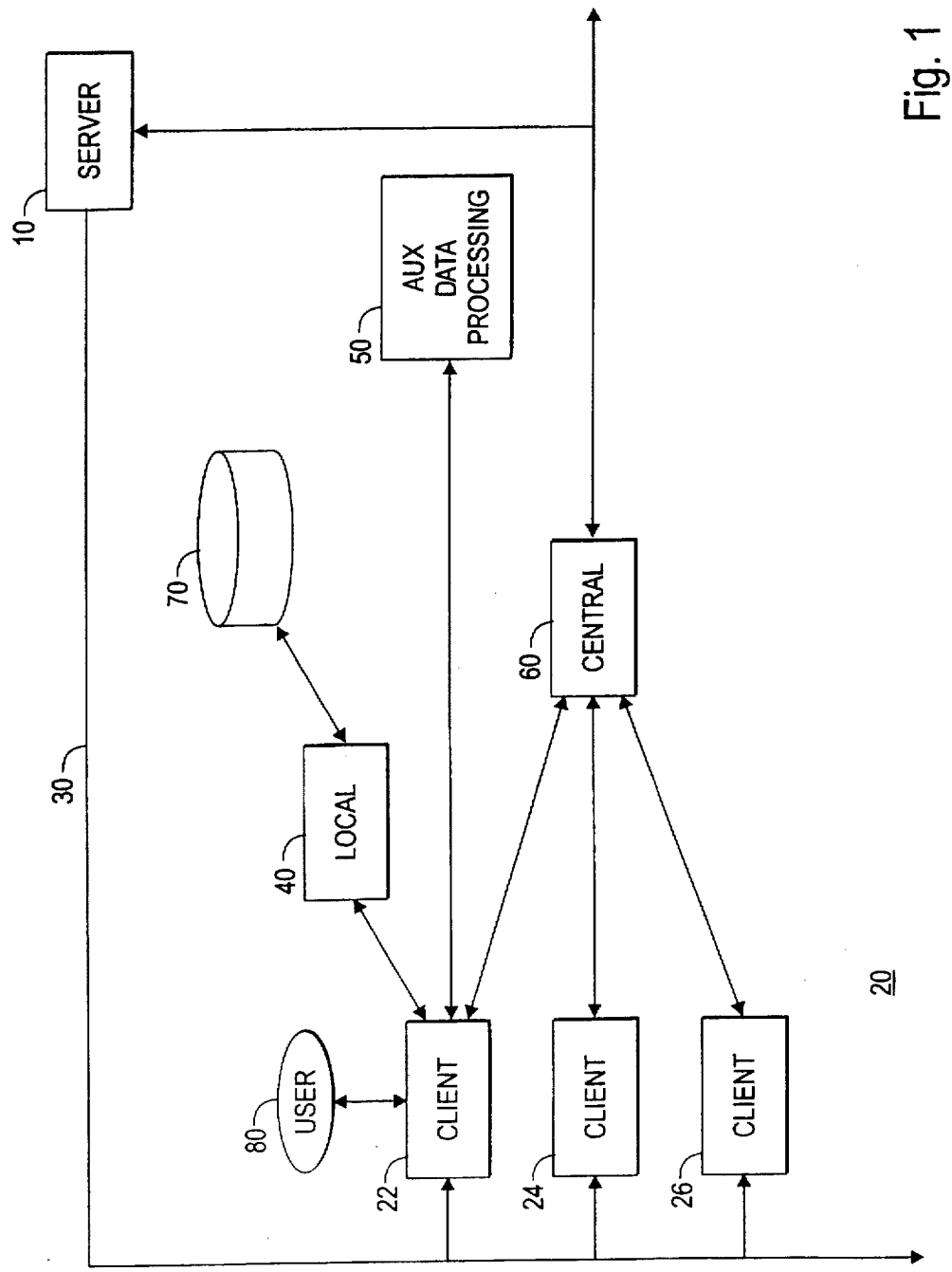
Figure 3:
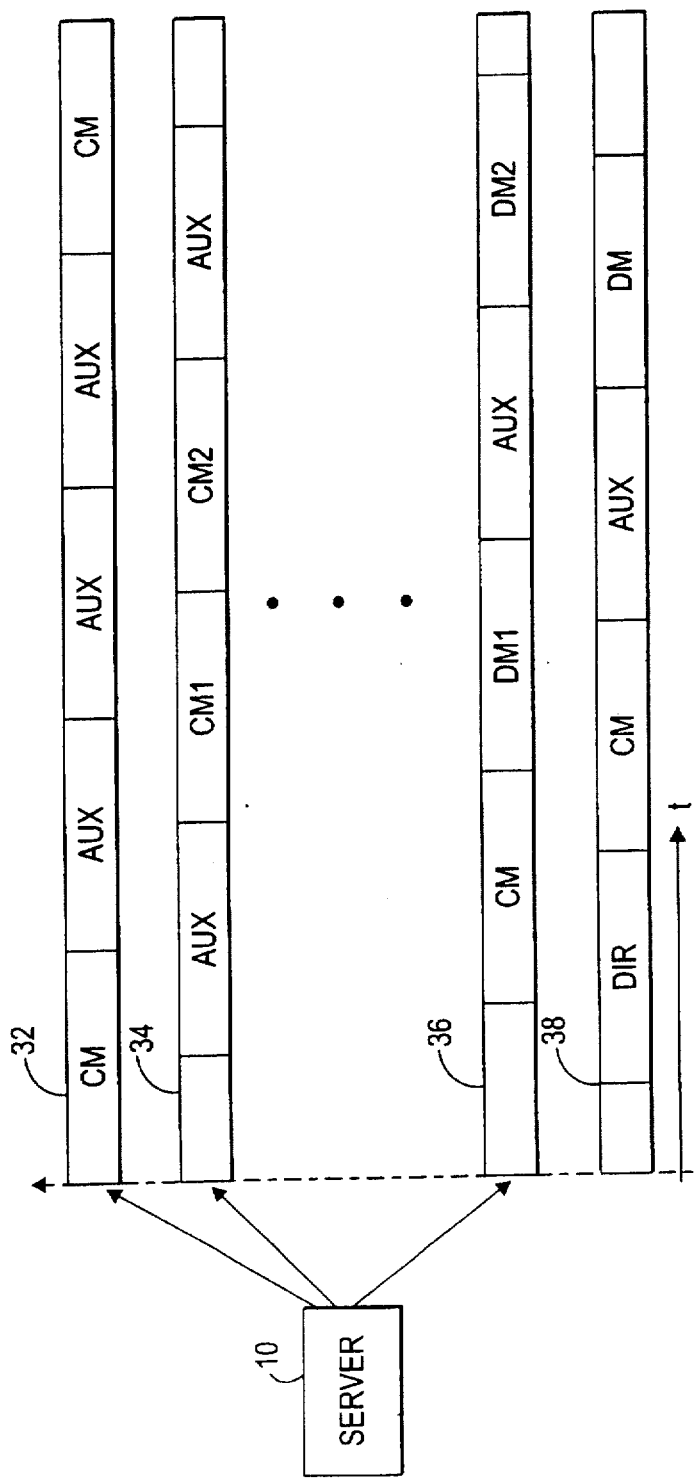

FIG. 3 is a timing diagram illustrating the data streams produced by the server computer 10 in a distributed computing system as illustrated in FIG. 1. In FIG. 3 server computer 10 is shown as simultaneously producing a plurality of packet streams 32–38. Each packet stream (32–38) is shown as a horizontal band divided into packets having the same duration and number of bits. As described above, it is possible that the size of the packets within any packet stream vary with the amount of data to be carried. In FIG. 3 it can be seen that the starting times of the packets are not synchronized. It is possible to synchronize the packets, but it in not necessary. In FIG. 3, packets carrying data representing directories are designated DIR, packets carrying data representing code modules are designated CM, packets carrying data representing data modules are designated DM, and packets carrying auxiliary data are designated AUX.

In the top series of packets 32, the leftmost packet contains data representing a code module, CM. This is followed by three packets containing auxiliary data, AUX, followed by another packet containing data representing the code module, CM. From the series of packets 32 it can be seen that the code module is repetitively produced. There may be more or fewer packets in between successive repetitions of the code module packets CM. The rate of repetition may be specified by the programmer when the application is programmed, and may be varied during the execution of the application.

In the next series of packets 34, the leftmost packet contains auxiliary data, AUX. The next two packets contain respective portions of a code module (CM1,CM2). The last packet contains auxiliary data, AUX. From the series of packets 34 it can be seen that if a code module is too large to be contained in a single packet, it may be carried by more than one, with each packet containing a portion of the code module. Although two packets are illustrated in the series of packets 34 as containing the code module (CM1,CM2), any number of packets may be used to carry the code module, depending upon its size. The two packets carrying the code module, (CM1,CM2) are repetitively transmitted (not shown) in the series of packets 34, as described above.

In the series of packets 36, the leftmost packet contains data representing a code module (CM). The next packet (DM1) is a first packet containing data representing a data module. The next packet contains auxiliary data, AUX. The next packet (DM2) is a second packet containing the remaining data representing the data module. From the series of packets 36 it may be seen that a data module (DM1,DM2), associated with the code module (CM), may also be included in the packet stream. Both the code module (CM) and the data module (DM1,DM2) are repetitively transmitted (not shown) in the series of packets 36. The rate of repetition of the code module (CM) may be different from that of the data module (DM1,DM2), and both rates may be specified by the application programmer and varied during the execution of the application.

It may further be seen that if the data module is too large to be contained in a single packet, it may be carried by more than one packet, with each packet containing a portion of the data module. Although two packets are illustrated in the series of packets 36 as containing the data module (DM1, DM2), any number of packets may be used to carry the data module, depending upon its size. It may be further seen that the packets carrying the data module need not be transmitted sequentially, but may have intervening packets in the packet stream. The same is true for multiple packets carrying a code module or directory module (not shown).

In the bottommost series of packets 38, the leftmost packet contains data representing the directory (DIR). The next packet contains data representing a code module (CM), followed by a packet containing auxiliary data (AUX) and a packet containing data representing a data module (DM). In the series of packet 38 all of a directory module (DIR), a code module (CM) and a data module (DM) in a single packet stream may be seen. The respective repetition rates of these three modules may be different, as specified by the programmer of the application, and may be varied during the execution of the application.

Figure 4:
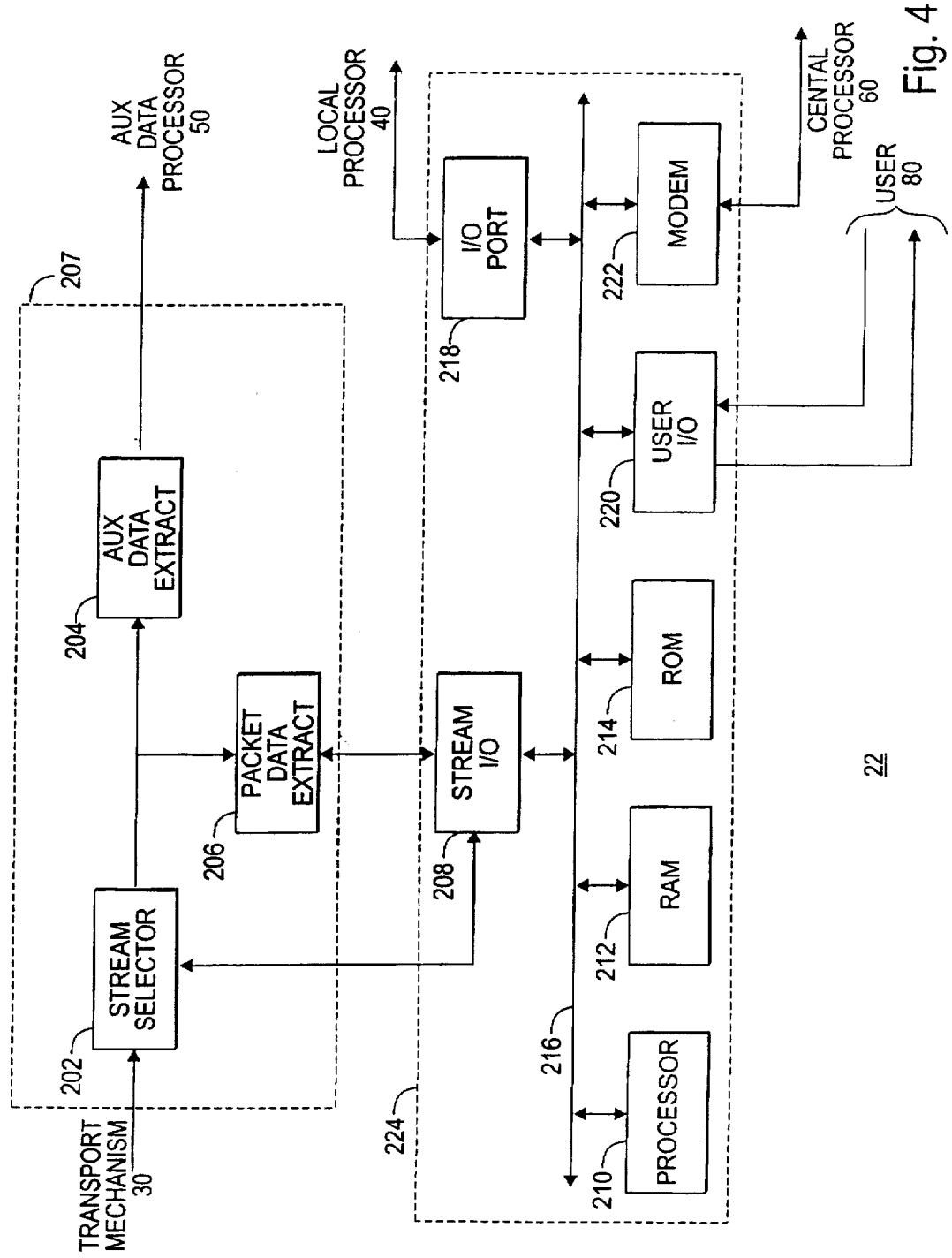
FIG. 4 is a block diagram of a client computer as illustrated in FIG. 1.

FIG. 4 is a block diagram of a client computer 22 as illustrated in FIG. 1. In FIG. 4, transport mechanism 30 (of FIG. 1) is coupled to an input terminal of a stream selector 202. An output terminal of stream selector 202 is coupled to respective input terminals of an auxiliary data extractor 204 and a packet data extractor 206. An output terminal of auxiliary data extractor 204 is coupled to the auxiliary data processor 50 (of FIG. 1). A bidirectional terminal of packet data extractor 206 is coupled to a corresponding terminal of a stream I/O adapter 208. A control output terminal of stream I/O adapter 208 is coupled to a corresponding control input terminal of stream selector 202. The combination of stream selector 202, auxiliary data extractor 204 and packet data extractor 206 form a data stream receiver 207 for client computer 22, illustrated by a dashed line in FIG. 4.

Stream I/O adapter 208 forms a part of a processing unit 224 in client computer 22, illustrated by a dashed line in FIG. 4. In addition to the stream I/O adapter 208, processing unit 224 includes a processor 210, read/write memory (RAM) 212 and read-only memory (ROM) 214 coupled together in a known manner via a system bus 216. Further input and output facilities are provided by an I/O port 218, coupled to the local processor 40 (of FIG. 1); user I/O adapter 220, for communicating with user 80; and modem 222, coupled to the central processing facility 60 (of FIG. 1); all also coupled to the system bus 216 in a known manner. Other adapters (not shown) may be coupled to system bus 216 to provide other capabilities to the processing unit 224.

As described above, auxiliary data extractor 204, I/O port 218 and modem 222 are not required in a client computer 20 according to the present invention. They are illustrated in FIG. 1 and FIG. 4 to show optional additional functionality.

In operation, processor 210 of processing unit 224 retrieves program instructions permanently stored in ROM 214, or temporarily stored in RAM 212, and executes the retrieved instructions to read data from ROM 212 and/or RAM 214, write data to RAM 212 and/or receive data from or supply data to outside sources via the I/O port 218, user I/O adapter 220 and/or modem 222, in a known manner. Under program control, processor 210 may also request a code and/or data module from the data stream supplied to the client computer 22 via the transport mechanism 30 (of FIG. 1). To retrieve this data, processor 210 first instructs stream I/O adapter 208 to send a selection control signal to the stream selector 202, possibly in response to user input from user I/O adapter 220. Then processor 210 issues a request for a specific code or data module to the stream I/O adapter 208. Stream I/O adapter 208 relays this request to the packet data extractor 204.

Transport mechanism 30 (of FIG. 1) supplies all of the plurality of packet streams (32–38 of) it carries to the stream selector 202, which passes only the selected packet stream. Auxiliary data extractor 204 monitors the selected packet stream, extracts the auxiliary data packets from it and supplies them directly to the auxiliary data processor 50 (of FIG. 1). Packet data extractor 206 similarly monitors the selected packet stream, extracts the directory, code and/or data module packets requested by the stream I/O adapter 208 and supplies them to the stream I/O adapter 208. The data in the packets returned to the stream I/O adapter 208 is supplied to the RAM 212. When the entire module has been retrieved from the packet stream (which may require several packets, as described above), processor 210 is notified of its receipt by the stream I/O adapter 208. Processor 210 may then continue execution of its program.

The data stream in a distributed computing system illustrated in FIG. 1 is similar to a mass storage system in prior art systems. An application program executing on the processor 210 makes a request for a module listed in the directory in the same manner that such a program would make a request for a file containing a code or data module previously stored on a mass storage device in a prior art system. The data stream receiver 207 is similar to a mass storage device, and stream I/O 208 acts in a similar manner to a mass storage adapter on a prior art system by locating the desired data, transferring it to a predetermined location (I/O buffer) in the system memory and informing the processor of the completion of the retrieval. However, the stream I/O adapter 208 can only retrieve code and data from the data stream; data cannot be written to the data stream.

As described above, the distributed computing application may be divided into more than one code module, each containing executable code for a different portion of the distributed computing application. When a particular code module is desired, processor 210 requests that code module from stream I/O adapter 208. When execution of that module has completed, processor 210 requests the next module from stream I/O 208. Because code and data modules are repetitively carried on the data stream, a module may be deleted from RAM 212 when it is not currently needed without the necessity of temporarily being stored, because if it is required later, it may again be retrieved from the data stream when needed. However, if RAM 212 has sufficient capacity, processor 210 may request stream I/O adapter to simultaneously load several code modules into RAM 212. If this can be done, then processor 210 may switch between code modules without waiting for stream I/O adapter 208 to extract them from the data stream.

As described above, other I/O adapters may be coupled to the system bus 216 in a known manner. For example, in an interactive TV system, a graphics adapter may be coupled to system bus 216. The graphics adapter generates signals representing graphical images, in a known manner, in response to instructions from the processor 210. Further, these signals may be combined with the standard video signal produced by the video decoder (described above) in the auxiliary data processor 50 of an interactive TV system. When the graphical image representative signal and the standard video signal are combined, the resulting signal represents an image in which the image generated by the graphics adapter is superimposed on the image represented by the broadcast video signal. It is also possible to selectively combine these two image representative signals under the control of the processor 210.

An interactive TV system, may also include a sound adapter coupled to the system bus 216. The sound adapter generates a signal representing a computer generated sound (such as music, synthesized voice or other sound), in a known manner, in response to instructions from the processor 210. Further, these signals may be combined with the standard audio signal produced by the audio decoder (described above) in the auxiliary data processor 50 of an interactive TV system. When the sound representative signal and the standard audio signal are combined, the resulting signal represents the combination of the sound generated by the sound adapter and the broadcast audio signal. It is also possible to selectively combine these two sound representative signals under the control of the processor 210.

The timing of the generation and display of the graphical image and sound representative signals, may be controlled by receipt of the time code data from the data stream. This enables an executable code module to synchronize the display of processor generated image and presentation of processor generated sound to the broadcast video and audio. It is further possible to synchronize the operation of the interactive TV application by the insertion of specialized packets into the data stream which cause an interrupt of the code currently executing in processor 210. Stream I/O 208 monitors the data stream for such specialized packets, and generates an interrupt, in a known manner, for the processor 210. Processor 210 responds to that interrupt, also in known manner, by executing an interrupt service routine (ISR). This ISR may be used for synchronization of the interactive TV application, or other purposes.

A client computer 22 in a distributed computing system as illustrated in FIG. 1 does not need a mass storage device, nor a large amount of RAM 212. Such a system decreases the cost of a client computer, and increases the functionality of the lower cost client computers. In addition, such a client computer has the option of participating in a distributed computing function, may join in the distributed computing function at any time (or may drop out and return later), and may participate at its own pace.

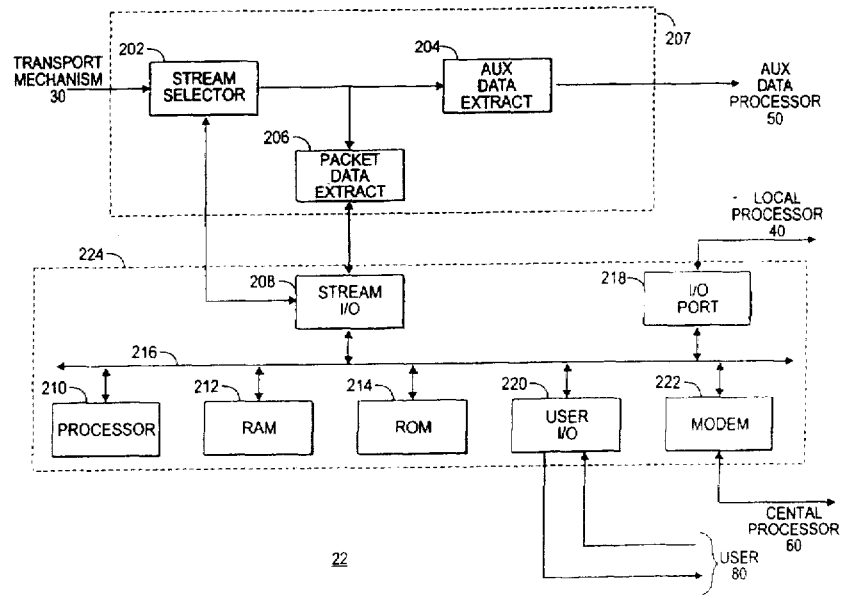

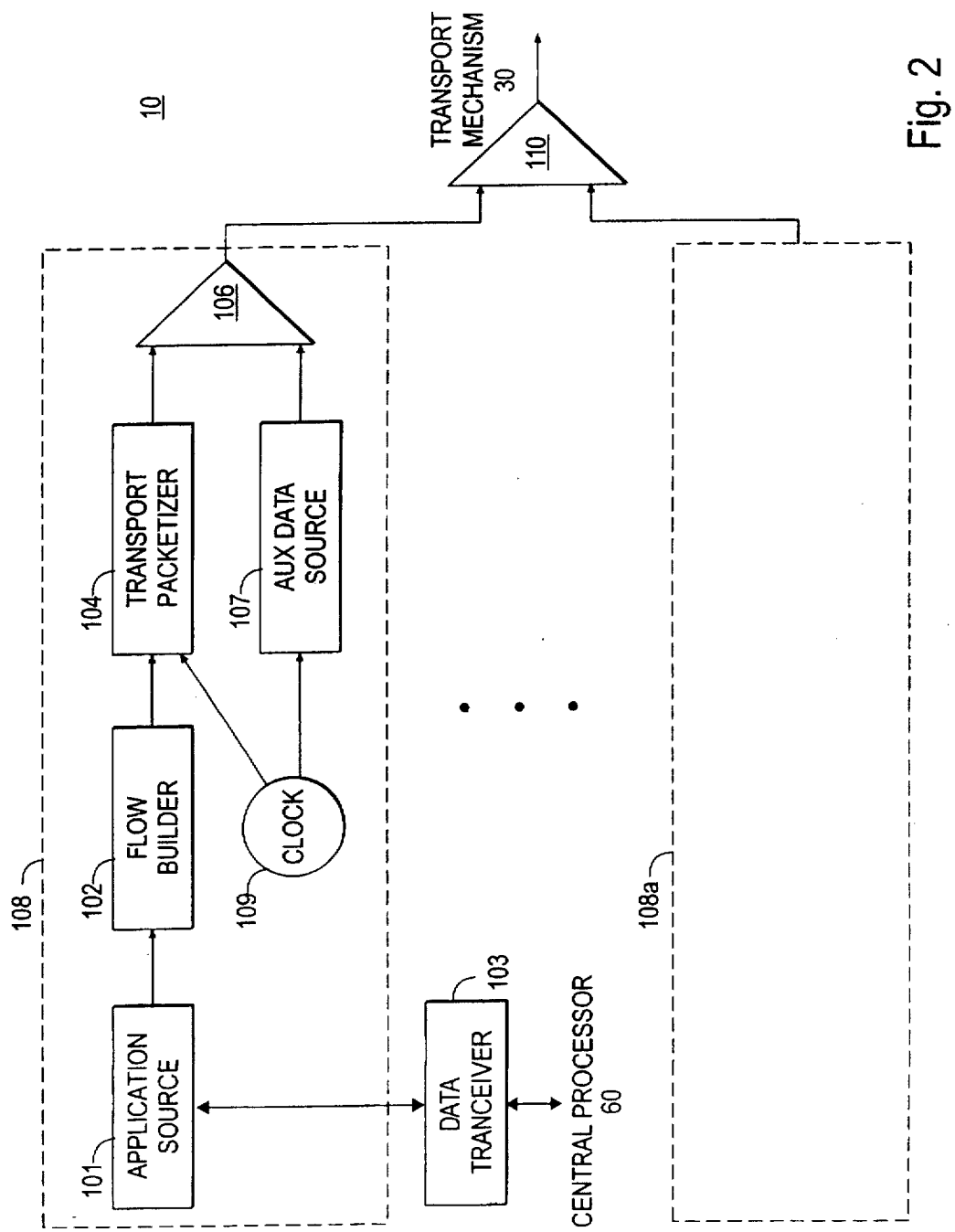

What is claimed is:

1. A distributed computer system comprsing:
   a source of a data stream having a distributed computing application including at least one code module, a data module and a directory module, said directory module containing infomation related to said data module, which distributed computing application is repetitively transmitted without a request from receiving client computer apparatus; and
   a client computer, receiving said data stream, extracting said distributed computing application from said data steam, and auto-executing the extracted distributed computing application; wherein
   said client computer extracts said directory module from said data stream and uses said data module related information to extract said data module from said data stream, and processes said data module with said code module.

2. The client computer of claim 1, wherein:
   said distributed computing system is an interactive television system, said data stream includes compressed television video and audio signal, and said client computer, responsive to said distributed computing application produces and combines graphics with reproduced said television video.

3. A distributed computer system comprising:
   a source of a data steam including data representing a distributed computing application, which distributed computing application is repetitively transmitted without a request from receiving client computer apparatus; and a client computer, receiving said data stream, extracting said distributed computing application representative data from said data stream, and auto-executing said exacted distributed computing application; wherein said distributed computing application is formed as modules including a directory module containg information interrelating code modules;

said client computer includes memory which is insufficient to store and execute an entire distributed computing application; and said client computer, responsive to information in said directory module, extracts code modules from said data stream to execute said distributed computing application.

4. The client computer of claim 3, wherein:

said distributed computing system is an interactive television system, said data stream includes compressed television video and audio signal, and said client computer, responsive to said distributed computing application produces and combines graphics with reproduced said television video.

5. In a distributed computer system, a client computer, comprising:

an input terminal, for receiving a data stream including data representing a distributed computing application which is repetitively transmitted without a request from said client computer, said data stream arranged in a series of packets, at least one of which includes a directory containing information inter-relating ones of the packets containing said distributed computing application;

a data stream receiver, coupled to the input terminal, for receiving the data stream, extracting the directory packet and responsive to the directory, extracting packets containing said distributed computing application representative data; and a processing unit, coupled to the data stream receiver, for assembling said distributed computing application and executing the distributed computing application.

6. The client computer of claim 5, wherein:

said distributed computing application is segmented into modules and the modules are segmented into a series of packets and the data stream receiver includes a packet data extractor, coupled to the input terminal, for extracting the packets carrying the distributed computing application representative data; and said client computer includes insufficient memory to load a complete distributed computing application and said distributed computing application conditions the packet extractor to extract program modules from the data stream as needed to continue execution of the said distributed computing application.

7. A distributed computer system comprising:

a source of a data stream including data representing a distributed computing application, which distributed computing application is repetitively transmitted independent of receiving client computer apparatus; and a client computer, receiving the data stream, extracting the distributed computing application representative data from the data stream, and auto-executing the extracted distributed computing application, wherein:

the distributed computing application is formed as modules including a directory module containing information interrelating application modules;

said client computer includes memory which is insufficient to store and execute an entire distributed computing application; and the client computer, responsive to information in the directory module, extracts appropriate program modules from the data stream as needed to execute the distributed computing application.

8. The computer system of claim 7, wherein:

the data stream source produces the data stream further including a data module and a directory module which contains information related to the data module; and the client computer extracts the data module from the data stream responsive to information related to the data module in the extracted directory module and executes the extracted code module to process the extracted data module.

9. The client computer of claim 7, wherein the distributed computing system is an interactive television system, and the auxiliary data is compressed television video and audio signal, and said processing unit, responsive to said distributed computing application produces and combines graphics with reproduced said television video.

10. In a distributed computer system, a client computer, comprising:

an input terminal, for receiving a data stream including data representing a distributed computing application which is repetitively transmitted independently of said client computer, said data stream arranged in a series of packets, at least one of which includes a directory containing information inter-relating ones of the packets containing said distributed computing application;

a data stream receiver, coupled to the input terminal, for receiving the data stream, extracting the directory packet and responsive to the directory, extracting packets containing said distributed computing application representative data; and a processing unit, coupled to the data stream receiver, for assembling said distributed computing application and executing the distributed computing application, wherein;

said distributed computing application is segmented into modules and the modules are segmented into a series of packets;

the data stream receiver includes a packet data extractor, coupled to the input terminal, for extracting the packets carrying the distributed computing application representative data; and said client computer includes insufficient memory to load a complete distributed computing application and said distributed computing application conditions the packet extractor to extract program modules from the data stream as needed to continue execution of the said distributed computing application.

* * * * *

UNITED STATES PATENT AND TRADEMARK OFFICE
CERTIFICATE OF CORRECTION

PATENT NO.    : 5,915,090  
DATED         : June 22, 1999  
INVENTOR(S)   : Kuriacose Joseph et al.

Page 1 of 6

It is certified that error appears in the above-identified patent and that said Letters Patent is hereby corrected as shown below:

<u>Title page,</u>  
The title page, showing the illustrative figure should be deleted and substitute therefor the attached title page.

<u>Drawings,</u>  
Drawing Sheets 1-19, consisting of FIGS. 1-15, should be deleted and substitute therefor Drawing Sheets 1-4, consisting of FIGS. 1-4, as shown on the attached pages.

Signed and Sealed this

Twelfth Day of February, 2002

Attest:

JAMES E. ROGAN  
*Director of the United States Patent and Trademark Office*

*Attesting Officer*

United States Patent [19]
Joseph et al.

[11] Patent Number: 5,915,090
[45] Date of Patent: Jun. 22, 1999

[54] APPARATUS FOR TRANSMITTING A DISTRIBUTED COMPUTING APPLICATION ON A BROADCAST TELEVISION SYSTEM

[75] Inventors: Kuriacose Joseph, Plainsboro; Ansley Wayne Jessup, Jr., Willingboro, both of N.J.; Vincent Dureau, Venice; Alain Delpuch, Los Angeles, both of Calif.

[73] Assignee: Thomson Consumer Electronics, Inc., Indianapolis, Ind.

[21] Appl. No.: 08/819,274

[22] Filed: Mar. 18, 1997

Related U.S. Application Data

[62] Division of application No. 08/233,908, Apr. 28, 1994, Pat. No. 5,819,034.

[51] Int. Cl.$^6$ .................................................. G06F 9/44
[52] U.S. Cl. ............................ 395/200.32; 395/200.3; 395/200.31; 395/200.32; 395/200.33; 348/11; 348/12; 348/13; 380/23; 380/25
[58] Field of Search ....................... 395/200.32, 200.33, 395/200.31, 200.3, 6, 7; 364/DIG. 1; 348/11, 12, 13; 380/23, 25

[56] References Cited

U.S. PATENT DOCUMENTS

| | | | |
|---|---|---|---|
| 3,602,891 | 8/1971 | Clark | 340/172.5 |
| 3,803,491 | 4/1974 | Osborn | 455/5.1 |
| 3,891,792 | 6/1975 | Kimura | 261/87 |
| 4,264,925 | 4/1981 | Freeman et al. | 348/11 |
| 4,323,922 | 4/1982 | Toonder et al. | 380/7 |
| 4,528,589 | 7/1985 | Block et al. | 380/20 |
| 4,937,784 | 6/1990 | Masai et al. | 380/9 |
| 4,965,825 | 10/1990 | Harvey et al. | 380/9 |
| 5,129,080 | 7/1992 | Smith | 395/182.02 |
| 5,168,356 | 12/1992 | Acampora et al. | 348/409 |
| 5,191,573 | 3/1993 | Hair | 369/84 |
| 5,343,239 | 8/1994 | Lappington et al. | 348/12 |
| 5,371,550 | 12/1994 | Shibutani et al. | 348/570 |
| 5,440,632 | 8/1995 | Bacon et al. | 380/20 |
| 5,440,744 | 8/1995 | Jacobson et al. | 395/200.33 |
| 5,559,548 | 9/1996 | Davis et al. | 348/6 |
| 5,635,978 | 6/1997 | Alten et al. | 348/7 |

FOREIGN PATENT DOCUMENTS

| | | |
|---|---|---|
| 0 145 063 A2 | 6/1985 | European Pat. Off. |
| 0 570 683 A2 | 11/1993 | European Pat. Off. |
| 0 583 186 A1 | 2/1994 | European Pat. Off. |

OTHER PUBLICATIONS

Zander et al, "Softnet—An Approach to High Level Packet Communication", Computer Networking Conferences, pp. 1–4, Mar. 19, 1983.

*Primary Examiner*—Larry D. Donaghue
*Assistant Examiner*—Dzung C Nguyen
*Attorney, Agent, or Firm*—Joseph S. Tripoli; Eric P. Herrmann; Ronald H. Kurdyla

[57] ABSTRACT

A distributed computer system is disclosed which comprises a source of a continuous data stream repetitively including data representing a distributed computing application and a client computer, receiving the data stream, for extracting the distributed computing application representative data from the data stream, and executing the extracted distributed computing application.

10 Claims, 4 Drawing Sheets